US012798113B2

(12) United States Patent
Schluntz et al.

(10) Patent No.: US 12,798,113 B2
(45) Date of Patent: Nov. 17, 2026

(54) MOBILE ROBOT FOR ELEVATOR INTERACTIONS

(71) Applicant: Cobalt AI, LLC, Austin, CA (US)

(72) Inventors: Erik Schluntz, San Jose, CA (US); Travis J. Deyle, San Jose, CA (US); Michael Ferguson, Concord, NH (US); Sarvagya Vaish, Albany, CA (US); Alejandro Ramirez de Arellano, San Francisco, CA (US); Daniel Freymann Koelker, San Antonio, CA (US)

(73) Assignee: Cobalt AI, LLC, Austin, TX (US)

( * ) Notice: Subject to any disclaimer, the term of this patent is extended or adjusted under 35 U.S.C. 154(b) by 346 days.

(21) Appl. No.: 16/861,534

(22) Filed: Apr. 29, 2020

(65) Prior Publication Data

US 2021/0339399 A1 Nov. 4, 2021

(51) Int. Cl.
*B25J 11/00* (2006.01)
*B25J 5/00* (2006.01)
(Continued)

(52) U.S. Cl.
CPC ............... *B25J 11/008* (2013.01); *B25J 5/00* (2013.01); *B25J 9/1697* (2013.01); *B25J 13/006* (2013.01);
(Continued)

(58) Field of Classification Search
CPC ... B25J 11/00; B25J 11/008; B25J 5/00; B25J 5/007; B25J 9/00; B25J 9/1694;
(Continued)

(56) References Cited

U.S. PATENT DOCUMENTS 8,014,897 B2 * 9/2011 Norman ................. A63H 30/04 700/245
9,329,597 B2 5/2016 Stoschek et al.
(Continued)

FOREIGN PATENT DOCUMENTS

CN 210616580 U * 5/2020
JP H 05319749 A * 12/1993
(Continued)

OTHER PUBLICATIONS

"Sensors for Obstacle Detection a Survey", 30th ISSE 2007 IEEE, pp. 100-105. (Year: 2007).*
KR-20150015575-A English Translation (Year: 2015).*
KR-20090039115-A English Translation (Year: 2009).*
(Continued)

*Primary Examiner* — Khoi H Tran
*Assistant Examiner* — Sarah A Tran

(57) ABSTRACT

A mobile robot is configured to operate in commercial or industrial settings, such as office buildings or retail stores. The mobile robot can have a motorized base, a robot body on the motorized base, and a mechanical arm coupled to the robot body. The mobile robot can move between floors of a building using an elevator. The mobile robot can interact with an elevator system to call an elevator to a current floor, for instance, using the mechanical arm. When a first elevator arrives to the current floor, the mobile robot identifies that doors of the first elevator are opening and interacts with the elevator system again to cause the first elevator to remain at the current floor. After the interaction, the mobile robot moves toward a target location within the first elevator.

14 Claims, 21 Drawing Sheets

(51) Int. Cl.

| | |
|---|---|
| ***B25J 9/16*** | (2006.01) |
| ***B25J 13/00*** | (2006.01) |
| ***B25J 19/02*** | (2006.01) |
| ***B66B 1/34*** | (2006.01) |
| ***B66B 1/46*** | (2006.01) |
| ***B66B 13/14*** | (2006.01) |
| ***G05D 1/00*** | (2006.01) |

(52) U.S. Cl.
CPC ........... *B25J 19/022* (2013.01); *B66B 1/3461* (2013.01); *B66B 1/468* (2013.01); *B66B 13/143* (2013.01); *G05D 1/0011* (2013.01); *G05D 1/0088* (2013.01)

(58) Field of Classification Search
CPC ... B25J 9/16; B25J 9/1697; B25J 13/00; B25J 13/006; B25J 19/00; B25J 19/02; B25J 19/021; B25J 19/022; B66B 1/00; B66B 1/34; B66B 1/3415; B66B 1/3446; B66B 1/46; B66B 1/3461; B66B 1/468; B66B 13/00; B66B 13/02; B66B 13/14; B66B 13/143; G05D 1/00; G05D 1/02; G05D 1/021; G05D 1/0231; G05D 1/0011; G05D 1/0088; G05D 1/0234; G05D 1/0238; G05D 1/024; G05D 2201/00; G05D 2201/02; G05D 2201/0211; G05B 2219/00; G05B 2219/30; G05B 2219/40; G05B 2219/40411; G05B 19/18
See application file for complete search history.

(56) References Cited

U.S. PATENT DOCUMENTS

| | | | | |
|---|---|---|---|---|
| 9,436,926 | B2 | 9/2016 | Cousins et al. | |
| 9,535,421 | B1 | 1/2017 | Canoso et al. | |
| 9,792,434 | B1 | 10/2017 | Li et al. | |
| 9,844,879 | B1 | 12/2017 | Cousins et al. | |
| 9,939,814 | B1 | 4/2018 | Bauer et al. | |
| 10,012,996 | B1 | 7/2018 | Canoso et al. | |
| 10,252,419 | B2 | 4/2019 | Fritz et al. | |
| 2012/0041593 | A1* | 2/2012 | Ichinose | B66B 1/2458 700/258 |
| 2015/0205298 | A1 | 7/2015 | Stoschek et al. | |
| 2015/0242806 | A1 | 8/2015 | Cousins et al. | |
| 2017/0136631 | A1 | 5/2017 | Li et al. | |
| 2017/0364074 | A1 | 12/2017 | Lau et al. | |
| 2018/0292827 | A1* | 10/2018 | Artes | G01C 21/362 |
| 2018/0311820 | A1 | 11/2018 | Fritz et al. | |
| 2020/0398436 | A1* | 12/2020 | Cousins | B25J 5/007 |
| 2021/0302971 | A1* | 9/2021 | Cousins | G05D 1/0094 |
| 2022/0063108 | A1* | 3/2022 | Viilup | B25J 11/008 |

FOREIGN PATENT DOCUMENTS

| | | | | |
|---|---|---|---|---|
| JP | 2006290543 | A * | 10/2006 | B66B 1/468 |
| KR | 20090039115 | A * | 4/2009 | |
| KR | 20150015575 | A * | 2/2015 | |

OTHER PUBLICATIONS

CN-210616580-U English Translation (Year: 2016).*
JP-2006290543-A English Translation (Year: 2006).*

* cited by examiner

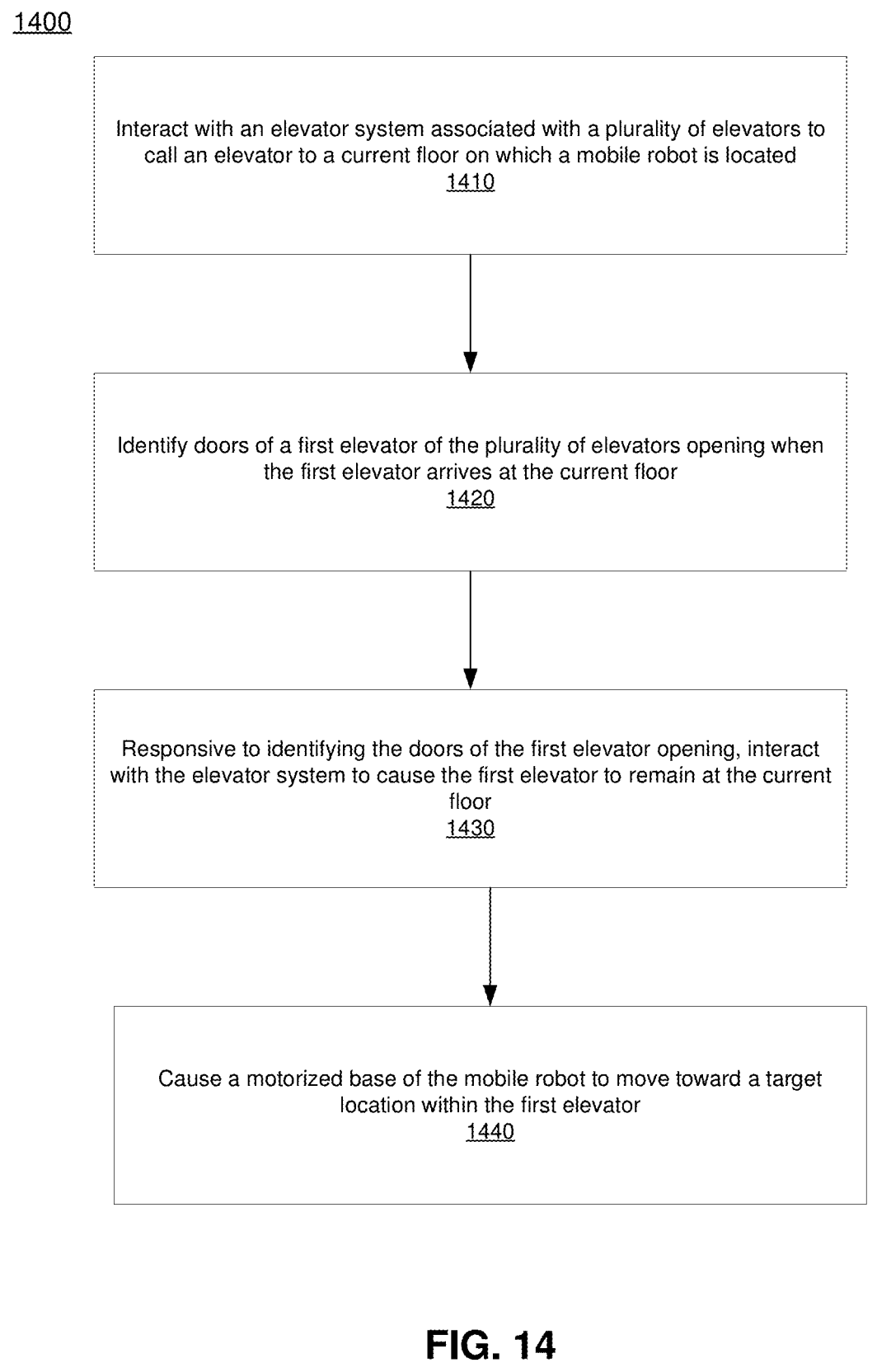

1400

Interact with an elevator system associated with a plurality of elevators to call an elevator to a current floor on which a mobile robot is located
1410

Identify doors of a first elevator of the plurality of elevators opening when the first elevator arrives at the current floor
1420

Responsive to identifying the doors of the first elevator opening, interact with the elevator system to cause the first elevator to remain at the current floor
1430

Cause a motorized base of the mobile robot to move toward a target location within the first elevator
1440

FIG. 14

MOBILE ROBOT FOR ELEVATOR INTERACTIONS

BACKGROUND

This application relates generally to robots, and in particular to robots configured for operation in commercial and industrial settings.

Robots are increasingly prevalent in society, particularly in entertainment and manufacturing contexts. However, the adoption of robots in these contexts has outpaced settings where frequent robot/human interactions are required. Examples of such settings include retail environments, security environments, and the like. The abilities of robots, for instance, the ability to interact with building and object infrastructure, creates an unaddressed demand for the implementation of robots in commercial and industrial settings.

SUMMARY

A mobile robot ("robot" hereinafter) configured for operation in commercial and industrial settings is described herein. The robot can perform a number of functions and operations in a variety of categories, including but not limited to security operations, cleaning operations, infrastructure or maintenance operations, navigation or mapping operations, inventory management operations, and robot/human interaction operations.

In some embodiments, the robot can include a motorized base and a robot body on the motorized base. The robot can move from one location to another via the motorized base within a building (e.g., an office building, a store, a campus) and outside the building (e.g., a parking lot). The robot body can be coupled to a mechanical arm that has up to three or more degrees of freedom (DOF). In combination with the motorized base, the robot can move the mechanical arm to position an end effector of the mechanical arm at a desired location in three-dimensional space. The mechanical arm can have one or more DOF in either rotational or linear motion that allows the robot to adjust a height of the end effector. The mechanical arm can have one or more DOF allowing the robot to extend and retract the mechanical arm to change a length of the mechanical arm or to pivot the arm from side to side.

In some embodiments, the robot can take an elevator to move from a current floor to a target floor. The controller of the robot can identify a location of the elevator system including a plurality of elevators based on maps of a building, semantic maps, sensors, and such. After identifying the location of the elevator system, the robot can move to a location for interacting with the elevator system. In an example, the robot may interact with the elevator system by pressing a button (e.g., up/down button) to call an elevator to the current floor. The controller causes the robot to press the button by causing the mechanical arm to move in position for pressing the button. After pressing the button, the controller identifies when an elevator arrives at the current floor by identifying which elevator doors open and generates a motion plan to move the robot into the elevator. For additional time to move into the elevator, the robot may interact with the elevator system to cause the elevator to remain at the current floor. For example, the robot may press the button again after the doors begin to close but before the doors close completely to cause the doors to reopen. After interacting with the elevator system to cause the elevator to remain at the current floor, the robot moves toward a target location in the elevator.

BRIEF DESCRIPTION OF THE DRAWINGS

FIG. 14 is a flow chart illustrating a process of a mobile robot interacting with an elevator, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1C:
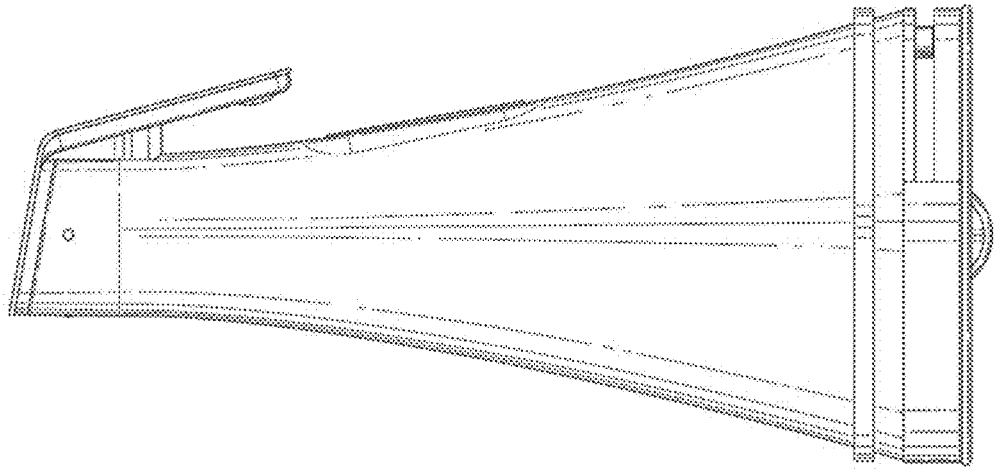
FIGS. 1A, 1B, and 1C illustrate various views of a mobile robot, according to one embodiment.
Figure 1B:
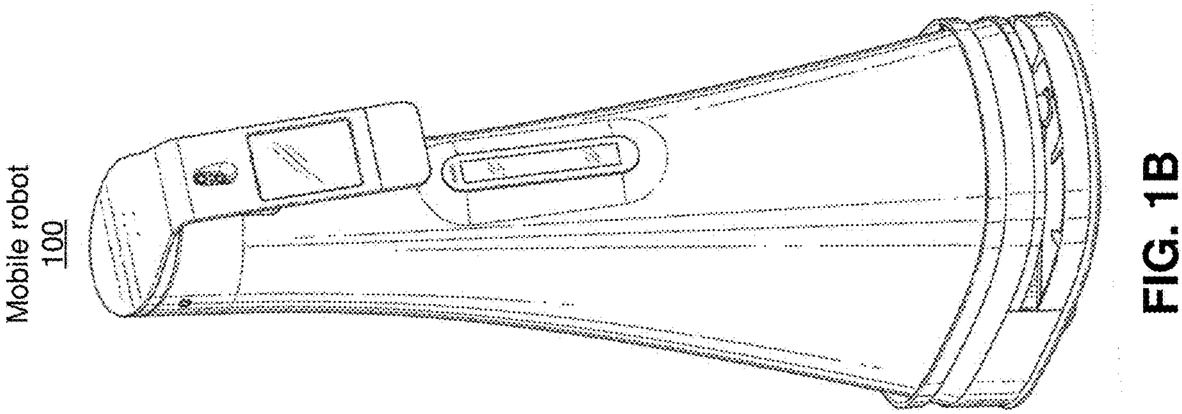
Figure 1A:
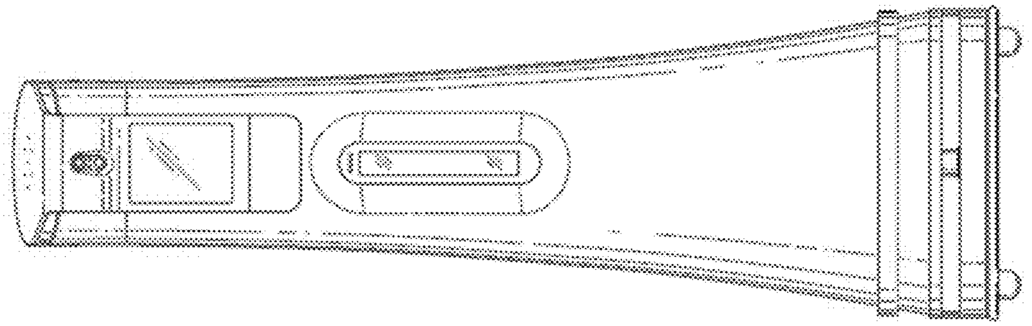

FIGS. 1A, 1B, and 1C illustrate various views of a mobile robot, according to one embodiment. The mobile robot 100 (or simply "robot" hereinafter) can navigate and move around an environment in which the robot is located, for instance by moving forward, backwards, sideways, and by turning or rotating up to 360 degrees within a plane defined by a surface on which the robot is located. In some embodiments, the robot can be deployed within a building, for instance on one or more floors or portions of floors of a building, can be deployed outside (for instance, in a parking lot), or can be deployed any other suitable location.

The robot 100 can include exterior fabric panels. The fabric panels can be removably or fixedly coupled around a housing body of the robot. In some embodiments, all or a portion of the robot includes a hard exterior surface, such as a hard plastic or metal exterior. The robot can also include a plurality of sensors and other components enclosed within the housing body, described below in greater detail. A portion of the sensors can be located within the body of the robot, for instance behind or underneath fabric panels such that the sensors can receive signals that propagate through the fabric panels. The structure, components, and functionality of the robot are described below in greater detail. It should be noted that in other embodiments, the robot can include different form factors, structures, components, and functionalities than those described herein.

Figure 2:
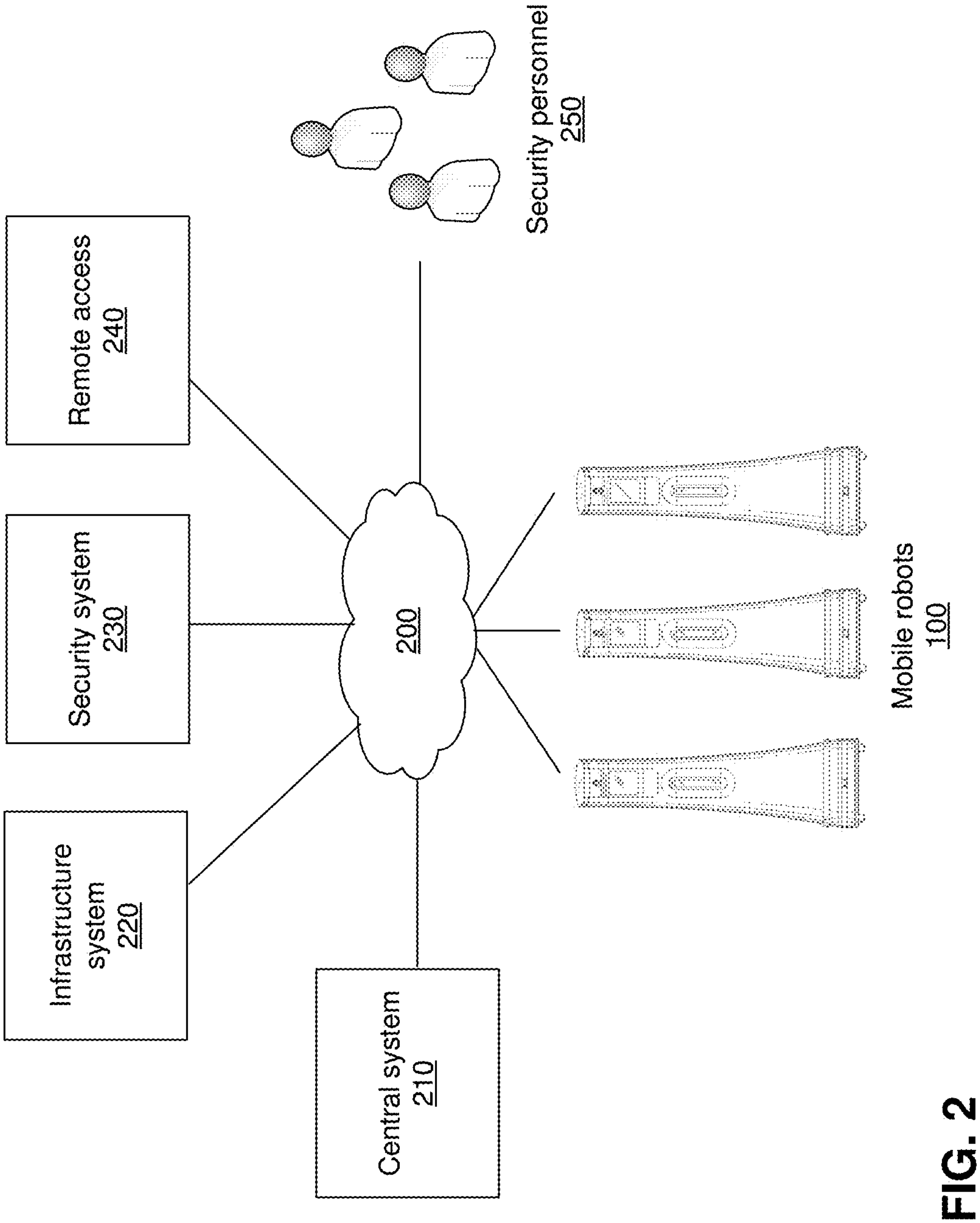
FIG. 2 is a high level block diagram illustrating a mobile robot environment, according to one embodiment.

FIG. 2 is a high level block diagram illustrating a mobile robot environment, according to one embodiment. The environment of FIG. 2 includes one or more robots 100, a central system 210, various infrastructure systems 220, various security systems 230, a remote access interface 240, and one or more security personnel 250, communicatively connected through the network 200. It should be noted that in other embodiments, the environment of FIG. 2 can include fewer, additional, or different components than those described herein. Each of the components of FIG. 2 can include one or more computer systems, custom hardware or electronic systems, or any other system configured to enable the components of FIG. 2 to perform the functions described herein.

The environment of FIG. 2 can include any number of robots 100, for instance 1, 2, 10, or more. For example, the environment of FIG. 2 can include one or more buildings, and can include one or more robots per building (for instance, one robot per building floor). One or more security personnel 250 (for instance, one or more robot operators) can control or monitor the robots, and can adjust a robot deployment as needed (for instance, by allocating additional robots to a building floor on which a security violation is detected). It should be noted that as used herein, "security personnel" can refer to remote or on-site robot operators, remote or on-site security system operators (e.g., individuals monitoring security cameras), on-site security guards, police personnel, building managers, or any other suitable individuals.

The central system 210 can be a central server or other computing system configured to provide instructions to the robots, to receive information from the robots, to access data corresponding to the robots or the other components of FIG. 2, to display the received information or accessed data (for instance, to a user of the central system), to perform one or more other functions as described herein, and to provide a communicative interface between, via the network 200, the robots and other components of FIG. 2. The central system is described in greater detail below.

The infrastructure system 220 (or infrastructure systems) can include one or more components of a building or environment in which the robots 100 are located. In some embodiments, the infrastructure systems are communicatively coupled to the network 200 or are otherwise capable of communication with the robots. Examples of system infrastructure systems include smart doors and windows, elevators, routers and other network components, power systems, smart lights, smart fire alarms and other sensors, connected furnace or air conditioning systems, "Internet of things" or IoT systems, and the like. In some embodiments, the infrastructure systems aren't capable of communication with via the network 200 or otherwise, for instance disconnected doors and windows, disconnected elevators, thermal vents, and the like. The infrastructure systems of FIG. 2 are described in greater detail below.

The security system 230 (or security systems) can also include one or more security components of a building or environment in which the robots 100 are located. Examples of security systems can include camera systems, access gates, door or window locks, audio detectors, motion detectors, security interfaces or displays, and the like. The security systems can be configured to communicate with the network 200 and/or robots, or may be disconnected systems (alarms that do not communicate and that must be manually reset). The security systems of FIG. 2 are described in greater detail below.

The remote access interface 240 is a computing system, such as a computer, a server, a phone or other mobile device, or any other system that enables a user to remotely access the network 200, and via the network, to interact with one or more other components of the environment of FIG. 2. For instance, a user can remotely access information via the remote access interface provided by the robots 100 to the central system 210, such as a video feed captured by one or more robots. Likewise, a user can remotely provide instructions to the infrastructure systems 220, security systems 230, and/or the robots via the remote access interface, for instance to investigate an unauthorized access of a portion of a building, to lock doors within the vicinity of an alarm, or to scan RFID tags for products within a portion of a store. The remote access interface can include a display for displaying information related to one or more components of FIG. 2, an input mechanism for receiving interactions from a user of the remote access interface, and a communicate interface enabling the remote access interface to communicate via the network 200. It should be noted that in some embodiments, the remote access interface can be implemented within hardware located remotely from the central system, the robots, or the other components of FIG. 2, for instance within a different building or on a different floor from the other components of FIG. 2.

The security personnel 250 can include guards located at guard stations, patrolling guards, access gate guards, or remote security personnel. For instance, the security personnel can include one or more robot operators configured to monitor and control the actions or movements of the robots 100. Robot operators can interact with robots via the central system 210 or via the remote access interface 240, and direct other security personnel as needed (for instance, by instructing security personnel to investigation a security violation detected by the robots).

The network 200 may be the Internet, a local area network (such as a building-wide or site-wide network), a wireless network, a mesh network, or any other network or combination thereof that allows communication between the components of FIG. 2. The connecting network 200 may use standard communications technologies and/or protocols, such as WiFi, Bluetooth, LTE, cellular networks, and the like.

Figure 3:
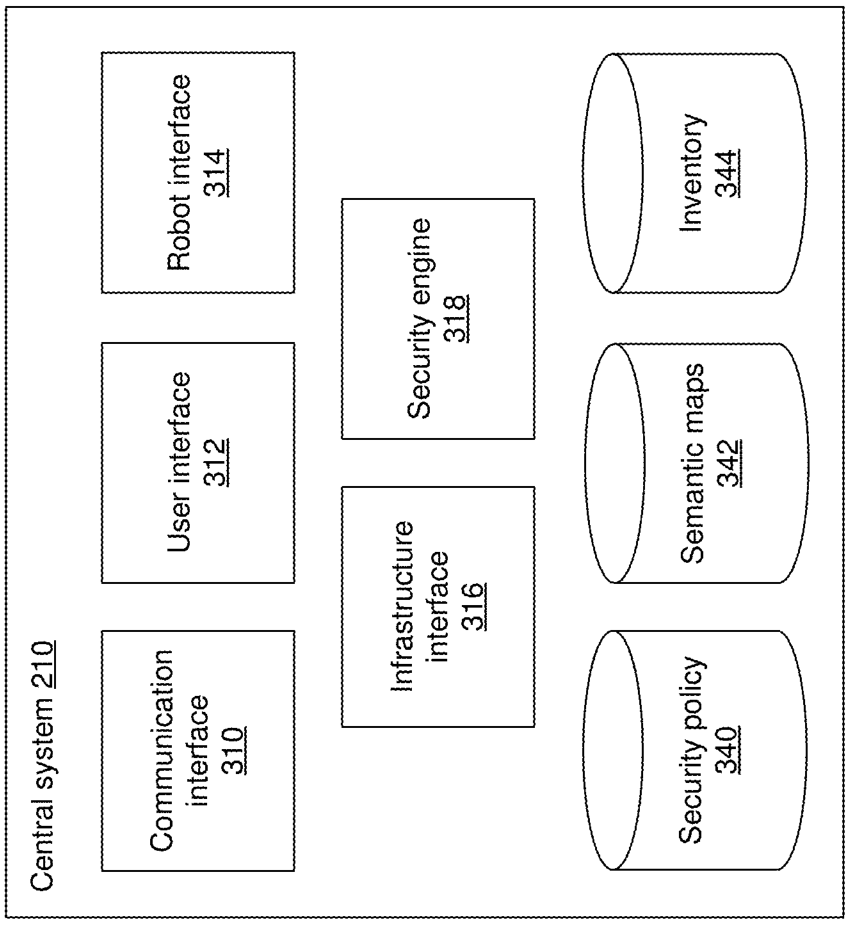
FIG. 3 is a block diagram of the central system of FIG. 2, according to one embodiment.

FIG. 3 is a block diagram of the central system of FIG. 2, according to one embodiment. The central system 210 of FIG. 2 includes a communication interface 310, a user interface 312, a robot interface 314, an infrastructure interface 316, a security engine 318, a security policy storage module 340, a semantic maps storage module 342, and an inventory storage module 344. In other embodiments, the central system includes fewer, additional, or different components than those described herein.

The communication interface 310 is configured to provide a communicative interface between the components of the central system 210 and the other components of FIG. 2. For instance, the communication interface enables the transfer of data between robots 100 and the central system. The communication interface can provide instructions or data to one or more infrastructure systems, security systems, or robots, for instance in response to a user command or during the performance of one or more security operations.

The user interface 312 is configured to enable a user of the central system 210 (such as a security personnel 250 or a robot operator) to interact with the central system. For instance, the user interface can include a graphical user interface (or GUI) displayed on hardware corresponding to the central system. The GUI can include video streams from one or more security cameras; can include a location of one or more robots 100 or objects overlaid on a map of a building, floor, or site; can include data corresponding to one or more infrastructure systems; and the like. The user interface can enable a user of the central system to provide one or more instructions or commands or otherwise interact with one or more components of the environment of FIG. 2, to configure or otherwise interact with one or more components of the central system, and to access and view data associated with one or more components of the environment of FIG. 2. The user interface, and GUIs associated with the user interface, are described below in greater detail.

The robot interface 314 is configured to enable the central system 210 (or a user of the central system) to interact with one or more robots 100. For instance, the robot interface can receive data from the one or more robots 100 via the communication interface 310 for display on the user interface 312. The robot interface can also provide data to the one or more robots via the communication interface, for instance in response to a command received from a user via the user interface. The robot interface can format data provided to and received from the robots into a format compliant with the robots and central system, respectively. The data received from, the instructions provided to, and the functions of the robots are described below in greater detail.

The infrastructure interface 316 is configured to enable the central system 210 (or a user of the central system) to interact with one or more infrastructure systems 220 via the communication interface 310. For instance, the infrastructure interface can lock one or more doors within a building, can cut power to a portion of a floor, and store received inventory information. Likewise, the security engine 318 is configured to enable the central system or a user of the central system to interact with one or more security systems 230 via the communication interface. For instance, the security engine can direct video cameras to a location within a building and receive footage from the cameras, can receive badge data from badge readers, and direct security personnel 250 to a building portion where motion was detected. The security engine can also implement one or more security policies or security operations, either independently from or at the direction of a user of the central system. Security policies and operations are described below in greater detail.

The security policy storage module 340 stores one or more security policies for implementation by the central system 210. A security policy can identify:

- portions of a building or floor, individuals who are authorized to access those portions, permitted times of access, and requisite security credentials
- times that particular doors, windows, and access gates are to be locked and unlocked
- routes or paths through buildings or floors for one or more robots 100 to patrol and corresponding times for patrol
- times of activation for security cameras, audio detectors, and motion detectors
- violations of security policies and the thresholds and conditions that trigger a security policy violation
- operations to be performed (by robots, security personnel 250, or infrastructure or security systems) in the event of a detected violation of a security policy
- communications and data from the components of FIG. 2 to be presented to a user of the central system The semantic maps storage module 342 can store one or more semantic maps, for instance semantic maps generated by robots 100. The user interface 312 can access and display one or more semantic maps to a user of the central system 210, and one or more components of the central system can update the displayed semantic map for subsequent storage in the semantic maps storage module in response to receiving information from one or more robots, security personnel 250, or any other component of FIG. 2. For instance, if a semantic map indicates that a window is open, and a robot patrolling within proximity of the window detects that the window has subsequently been closed, the semantic map can be updated (for instance, by the infrastructure interface 316) to reflect the closed status of the window and the updated semantic map can be stored in the semantic maps storage module.

The inventory storage module 344 stores information associated with objects within a building, within a floor, within a room or store, and the like. For instance, the inventory storage module can include a database detailing types of inventory, stock levels associated with each inventory type, and a location of each inventory object within a building. The inventory storage module can be updated, for instance, in response to receiving information from a robot 100 indicating that the location of one or more objects within a store has changed, that a missing object has been found, or that objects have been misplaced or lost. It should be noted that the inventory module can store locations, numbers, and types of objects in addition to retail objects or stock, for instance lab equipment, books or other reference materials, and the like. The inventory storage module can additionally store a status for objects (for instance, "misplaced", "lost", "stolen", "broken", "operational", and the like).

Figure 4:
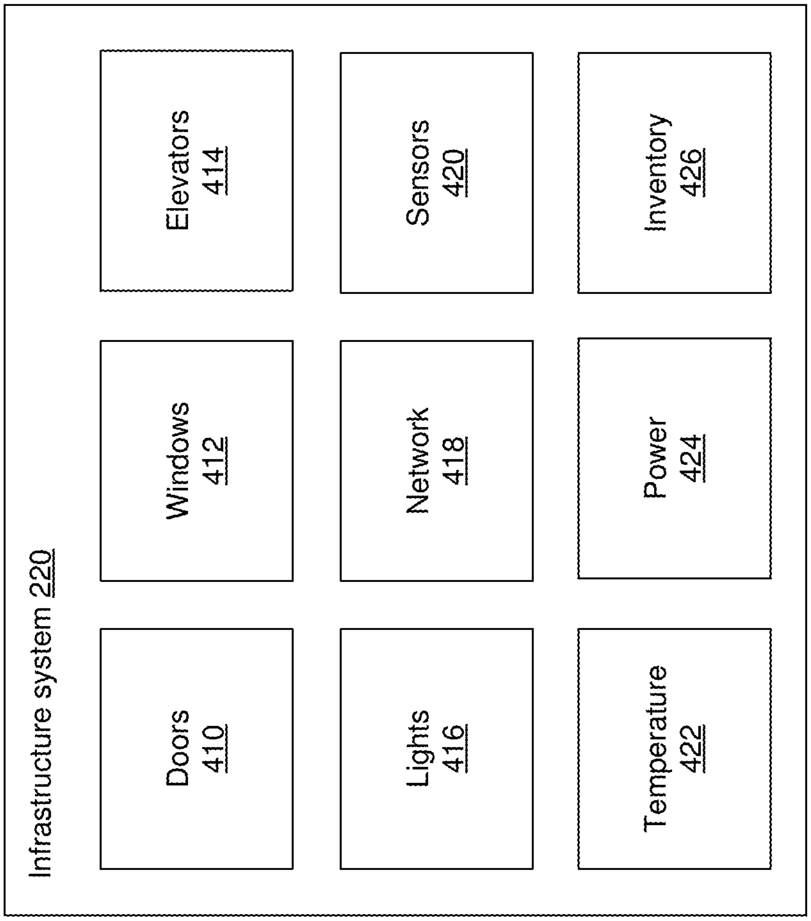
FIG. 4 is a block diagram of the infrastructure system of FIG. 2, according to one embodiment.

FIG. 4 is a block diagram of the infrastructure system of FIG. 2, according to one embodiment. In the embodiment of FIG. 4, the infrastructure system 220 includes doors 410, windows 412, elevators 414, lights 416, a network 418, sensors 420, temperature system 422, power system 424, and inventory 426. It should be noted that in other embodiments, the infrastructure system can include additional, fewer, or different components than those illustrated here.

The doors 410 and windows 412 of a building can be standard, disconnected, and/or non-electronic doors and windows. Alternatively, the doors and windows can be electronic and/or connected to other building infrastructure, for instance via the network 200. In embodiments where the doors and windows are electronic, a user of the central system 210, a robot 100, or a security personnel 250 can close, open, lock, or unlock the doors and windows, for instance manually (by the security personnel or robot) or electronically (by directly interfacing with the electronic subsystems of the doors and windows, or by providing instructions to the doors and windows via the network).

The elevators 414 can include one or more elevator within a building. The elevators can be connected to one or more components of the environment of FIG. 2, for instance the central system 210, or can be disconnected from the components of the environment. Instructions can be provided to the elevators, for instance by a user of the central system, a security personnel 250, or a robot 100 via the network 200 or directly to the elevator via an elevator interface, or manually, via a physical button press by the security personnel or the robot. Elevator instructions can include but are not limited to instructing the elevator to go to a particular floor (such as the floor a robot is on), stopping or disabling the elevator, opening and closing the elevator doors, controlling one or more elevator components (such as a speaker or display within the elevator), and the like.

The lights 416 can include various lighting systems within a building, for instance lights within particular rooms, on particular floors, or building-wide. The lights can be connected to other building systems, for instance via the network 200, and can be remotely activated or deactivated (for instance by a user of the central system 210 or a robot 100) or manually activated or deactivated (for instance by security personal 250 or a robot toggling a light switch or interface).

The network 418 can include networking infrastructure within a building or portion of a building, or across multiple buildings or locations. The network can include standard networking systems, such as routers, switches, severs, transceivers, and the like. The network can be connected to the other components of FIG. 2 via the network 200. A user (via the central system 210) or robot 100 can activate, deactivate, reset, or configure portions of the network. For instance, a robot, in response to determining that a portion of a wireless network within a building is currently down, can re-locate to a location within the building where the wireless network is active, and can instruct the central system to reset network systems corresponding to the non-functioning portion of the network.

The sensors 420 can include fire alarms, smoke detectors, carbon monoxide detects, gas or toxin detectors, thermometers, and the like. Information from the sensors can be provided to the central system 210, for instance directly via the network 200 or via a robot 100.

The temperature system 422 can include a furnace, air conditioning unit, fans or other air flow systems, thermal ductwork and corresponding control mechanisms (such as valves), and other systems associated with building temperature. Instructions can be provided to the temperature system, for instance from a user of the central system 210 via the network 200 or from a robot 100 (either via the network or by directly connecting to the temperature system). Example instructions include but are not limited to lowering the temperature or raising the temperature for an entire building or for building portions, increasing air flow, controlling one or more duct valves, and the like. Information can also be received from the temperature system by the central system, a robot, or by another component of FIG. 2. Examples of such information include power usage information, thermal information, system activity or capacity, and the like.

The power system 424 can include power infrastructure associated with a building. For instance, the power system can include one or more generators, feeds from an external power source, solar panels, breakers, power distribution units, power lines within and external to a building, meter boxes, robot recharge stations, vehicle recharge stations, and the like. In some embodiments, the power system is communicatively coupled to one or more components of FIG. 2, such as the central system 210, via the network 200. In such embodiments, a user of the central system, a security personnel 250, and/or a robot 100 can provide instructions to the power system via the network, for instance to deactivate a portion or all of a building's power infrastructure, to reset portions of the power infrastructure, to reset breakers, to turn generators on or off, and the like. The power system can also provide information to components of FIG. 2, for instance information detailing power usage within a building, within portions of a building, by components of a building, or information detailing power production or fuel usage by solar panels, generators, and the like.

The inventory 426 includes objects within a building, portion of a building, store, room, or other area. Examples of inventor include store inventory (objects for sale within the store), building equipment (such as lab equipment, computer equipment, and the like), sensitive objects (such as high security objects, expensive objects, and the like), vehicles, and the like. The inventory of a building can include tags or other receivers/transmitters (such as RFID tags) that can identify the object to which the tag is affixed to a system capable of reading the tag. Each object can include a unique identifier that is transmitted to a reader system, and, as described below, a robot 100 equipped with one or more RFID readers can identify and locate inventory within a building or building portion by navigating within a proximity to the corresponding object.

Figure 5:
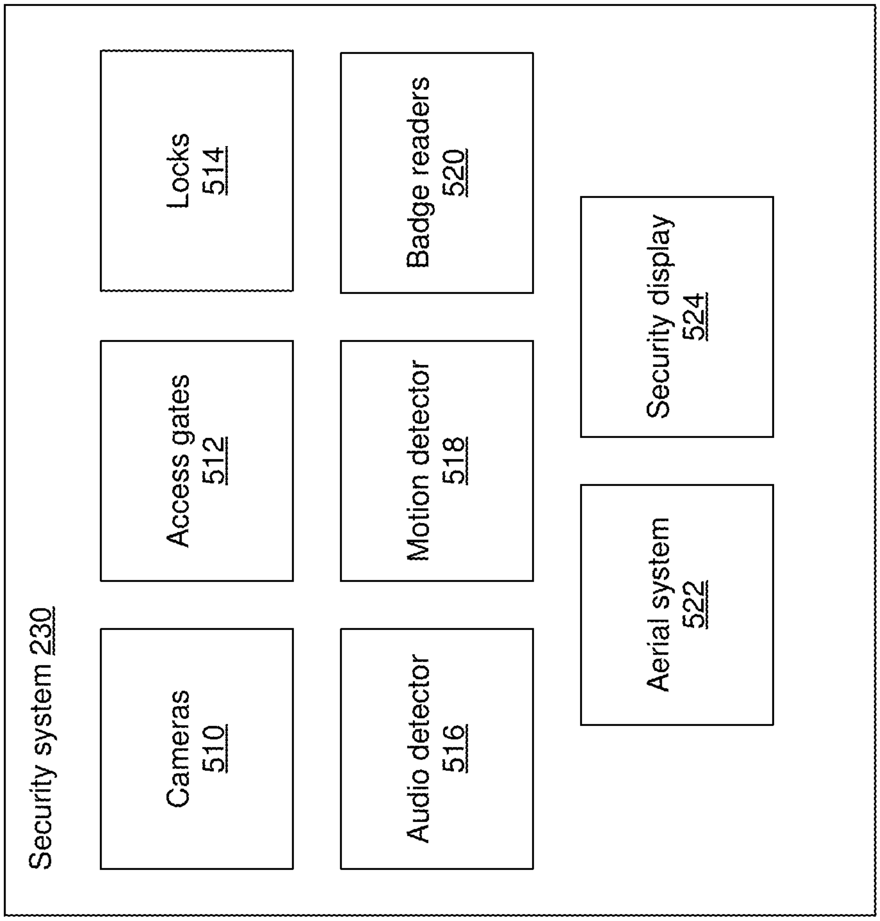
FIG. 5 is a block diagram of the security system of FIG. 2, according to one embodiment.

FIG. 5 is a block diagram of the security system of FIG. 2, according to one embodiment. In the embodiment of FIG. 5, the security system 230 includes cameras 510, access gates 512, locks 514, audio detectors 516, motion detectors 518, badge readers 520, aerial systems 522, and security displays 524. In other embodiments, the security system can include additional, fewer, or different components than illustrated herein. It should be noted that while many components of the security system can be disconnected from the other components of FIG. 2, the remainder of the description herein will be limited to embodiments in which the components of the security system can communicate via the network 200 (for instance, with the central system 210 or the robots 100).

The cameras 510 can be located within or external to a building, for instance within high-trafficked passages, high-security rooms or locations, locations corresponding to advantageous vantage points, and the like. In some embodiments, the field of view of a camera is fixed, while in other embodiments, the cameras can rotate, pan, tilt, or track objects or individuals, for instance in response to an instruction from a user of the central system 210 or in response to the detection of a suspicious noise or detected motion. The cameras can record video for storage and subsequent viewing or processing, or can stream the video to the central system or a robot 100. In some embodiments, the cameras can identify objects or individuals within video captured by the cameras and can provide this information to other components of FIG. 2, while in other embodiments, the central system identifies objects or individuals within video provided by the cameras, and provides this information to other components of the FIG. 2.

The access gates 512 can include physical barriers (such as barrier arms, walls, doors, and the like) configured to prevent or inhibit the movement of individuals, vehicles, or other objects. The access gates can allow individuals or vehicles to pass through in response to verifying that the individuals or vehicles are authorized to pass, for instance in response to verifying an individual's or vehicle's credentials or access permissions. In some embodiments, a robot 100, a user of the central system 210, or the central system itself can activate an access gate to allow or prevent individuals or vehicles from passing through, for instance in response to an instruction from the user or robot, or in response to a detected security violation or suspicious activity elsewhere within a vicinity of the access gate.

The locks 514 can be located within doors, windows, cabinets, cupboards, safes, or within any other suitable building infrastructure or object. The locks can be activated or deactivated by instructions from a robot 100, a user of the central system 210, or by the central system itself, for instance via the network 200. The locks can also be activated in response to the occurrence of a security violation or suspicious activity within a proximity of the locks.

The audio detector 516 is configured to detect audio signals, and to provide information describing the detected audio to one or more components of the environment of FIG. 2. Likewise, the motion detector 518 is configured to detect motion within a proximity of the motion detector, and to provide information describing the detect motion to one or more components of the environment of FIG. 2. For example, the audio detector can provide detected audio signals to the central system 210 for analysis, and the central system can determine if the detected audio signals are representative of a security violation. Likewise, the motion detector can provide detected motion signals to the central system, which can determine if the detected motion signals are representative of a security violation.

The badge readers 520 are configured to detect ID badges of individuals, to authenticate the identity, access credentials, or permissions of the individuals. The badge readers can provide information associated with the detected badges to components of the environment of FIG. 2, for instance via the network 200. The badge readers can include RFID readers, badge scanners, or any other suitable hardware. In some embodiments, badge readers are associated with doors, access gates, and the like such that an individual authenticated by the badge reader is granted access to the door, access gate, and the like.

The aerial systems 522 include one or more unmanned aerial vehicles (UAVs) configured to fly within a space (such as a building floor, parking lot, and the like). The aerial systems can receive instructions from components of FIG. 2, such as the central system 210 or a robot 100. The aerial systems can be instructed to patrol a particular area, for instance in response to a detected security violation or detected suspicious activity. The aerial systems can include cameras, RFID readers, or other sensors configured to capture information detected by the aerial systems and to provide the captured information to the central system, the robots, or other components of FIG. 2.

The security displays 524 are configured to display security information to individuals, such as a security status of a building or building portion, indications of security violations, and access credentials required to be in a particular location. The displayed security information can be received from the central system 210, from a robot 100, or from any other component of FIG. 2. The security displays can include hardware displays, and can be, for instance, tablet computers or interactive monitors. The security displays can be mounted within walls or other accessible locations. The security displays can receive inputs from individuals, for instance via a touch-screen interface of the security display or via any other suitable input mechanism. For instance, an individual can request access to a building portion, can request a door be unlocked, can request authentication, and the like via the security displays. The security displays can provide information describing the received inputs to the central security system or to any other component of FIG. 2, which in turn can perform a security action based on the provided information (for instance, unlocking a door or authenticating the individual).

Mobile Robot Housing

Figure 6B:
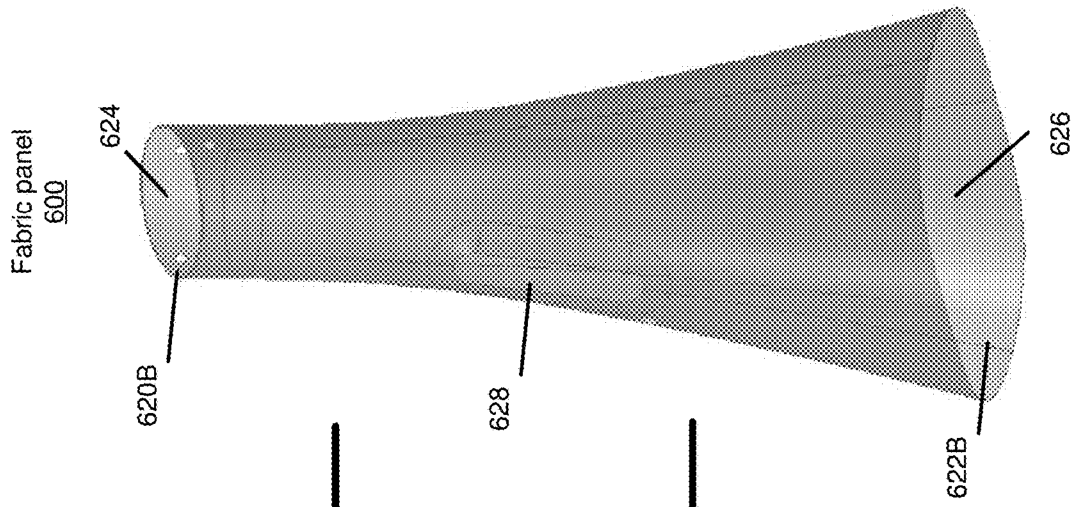
FIG. 6B illustrates a view of a removable fabric exterior for a mobile robot, according to one embodiment.
Figure 6A:
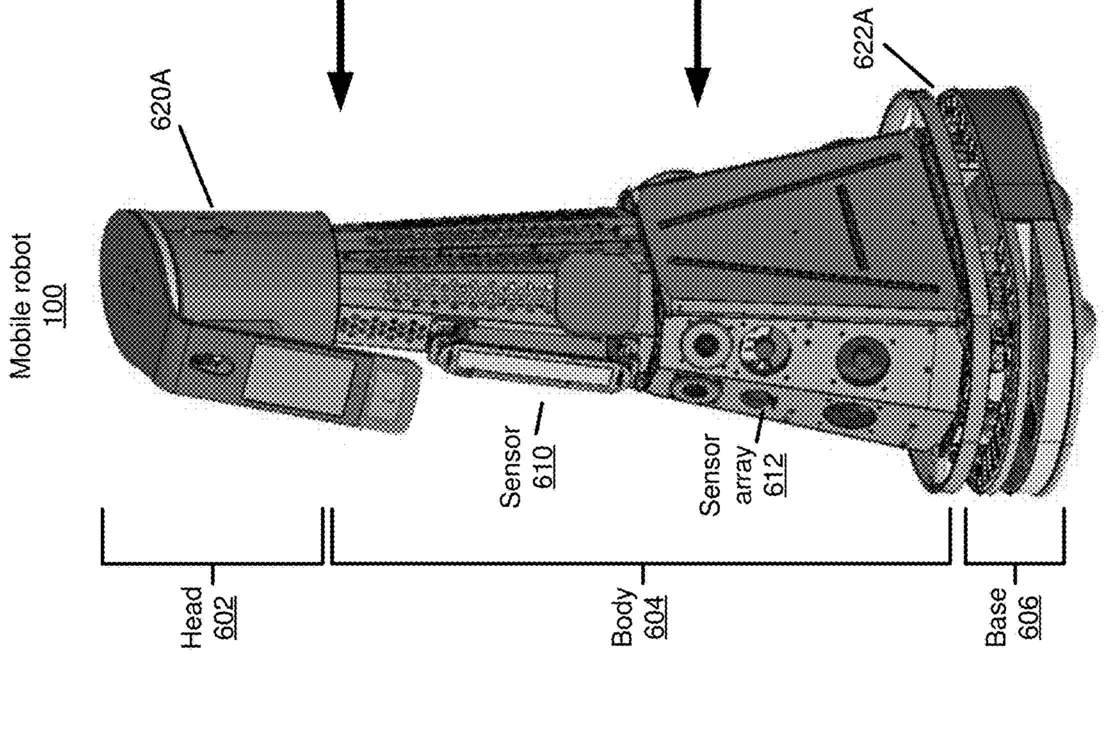
FIG. 6A illustrates a view of a mobile robot with a removed fabric exterior, according to one embodiment.

FIG. 6A illustrates a view of a mobile robot with a removed fabric exterior, according to one embodiment. The robot 100 of FIG. 6 includes a head portion 602, a body portion 604, and a base portion 606. The robot further includes a sensor 610 and a sensor array 612. As the fabric exterior is removed from the robot in the embodiment of FIG. 6A, the interior portion of the robot body is exposed. The robot also includes coupling means 620A located around the robot head and coupling means 622A located around the robot base.

FIG. 6B illustrates a view of a removable fabric exterior for a mobile robot, according to one embodiment. The fabric panel 600 includes coupling means 620B and 622B. The fabric panel also includes a top opening 624, a bottom opening 626, and a side opening 628. The circumference of the opening 624 corresponds to the circumference of the robot head, and the circumference of the opening 626 corresponds to the circumference of the robot base. Accordingly, the fabric panel is a tubular sock that can be stretched over and secured to the robot 100, thereby covering portions the interior of the robot. In some embodiments, the fabric panel is partially cone-shaped, with the diameter of the top opening being smaller than the diameter of the bottom opening, beneficially aiding in the placement of the fabric panel over the robot 100.

The fabric panel 600 can be made of any type of fabric material, for instance cotton, nylon, polyester, vinyl, velvet, or any other suitable or stretchable fabric material or blend/combination thereof. By stretching, the fabric panel of FIG. 6B can be placed over the head 602 of robot 100 (and any protrusions attached to the robot head) and any other components protruding from the robot body 604. Further, by stretching, contact made between the robot and other robots, individuals, or other objects can prevent damage to the fabric panel. It should be noted that in other embodiments, the fabric panel may include a material that does not significantly stretch.

The fabric panel 600 can include a fabric mesh material, allowing for the flow of air into and out of the robot 100, beneficially enabling the cooling of components of the robot interior by allowing for the transfer of heat out of the robot and through the fabric. Further, fabric may be semi-transparent or translucent, allowing for cameras, motion sensors, laser or LIDAR sensors, or other components within the robot to at least partially see through the fabric. Finally, the fabric may allow sound waves to pass through the fabric, allowing microphones or other audio components to capture sound waves passing through the fabric, and allowing speakers within the robot to transmit sound through the fabric.

The fabric panel 600 can couple to the robot 100 in a number of ways. In the embodiment of FIGS. 6A and 6B, coupling means 620B are configured to couple to coupling means 620A, and coupling means 622B are configured to couple to coupling means 622A. The coupling means 620B may be located around an inside perimeter of the top of the fabric panel, and the coupling means 622B may be located around an inside perimeter of the bottom of the fabric panel. Likewise, the coupling means 620A may be located around an outside perimeter of the robot head 602, and the coupling means 622A may be located around an outside perimeter of the robot base 606. In other embodiments, the coupling means of the fabric panel and the robot may be located in different locations on the fabric panel and the robot.

In some embodiments, the coupling means 620B and 622B include holes within the fabric of the fabric panel 600 and grommets located around the holes. Likewise, in some embodiments, the coupling means 620A and 622A include pins, latches, or other securing protrusions configured to reciprocally couple with the holes of the couplings means 620B and 622B when the holes are placed over the coupling means 620A and 620B. In other embodiments, the coupling means include buttons, zippers, Velcro, levers, buckles, or any other suitable means enabling the fabric panel to couple to the robot 100. In some embodiments, when the coupling means 620B are coupled to the coupling means 620A, and when the coupling means 622B are coupled to the coupling means when the fabric panel is coupled to the robot, the fabric of the panel is stretched and held in partial tension along the axis of the fabric panel from the opening 624 to the opening 626. The coupling means can be located on an inside surface of the fabric panel, beneficially enabling the fabric panel to couple to the robot 100 without the coupling means being visible (e.g., the coupling means may not include holes within the fabric panel, allowing for a seamless/holeless fabric exterior). In some embodiments, the coupling means include elastic bands (for instance, around an inside surface of the fabric panel adjacent to or within a threshold distance of the openings 624 and 626) that secure the fabric panel to the robot by tightening around reciprocal grooves within the head, body, and/or base. Such elastic bands can beneficially improve the ease of coupling the fabric panel to the robot, and can enable an installer to quickly align the fabric panel on the robot during installation by allowing the installer to move the fabric panel over the robot until the elastic bands snap into the reciprocal grooves.

While the fabric panel 600 covers certain sensors of the robot 100 when the fabric panel is coupled to the robot, such as the sensor array 612, the fabric panel can include one or more openings enabling other components of the robot to be exposed/not covered by the fabric. For example, the opening 628 corresponds to the sensor 610 such that when the fabric panel is coupled to the robot, the opening 628 is secured around the sensor 610 thereby exposing the sensor. Although only one opening is shown within the side of the fabric panel in the embodiment of FIG. 6B, in other embodiments, any number of openings can be included corresponding to any number of types of components of the robot. For instance, the robot body 604 can include cameras or other sensors that can be impaired by fabric, and the fabric panel can include openings to prevent such components from being covered by the fabric.

Although the fabric panel 600 of the embodiment of FIG. 6B is shown without an underlying structure, in some embodiments, the fabric panel can include a structure or skeleton to preserve the form or shape of the fabric panel. For instance, the fabric panel can include a first ring component along an inside perimeter of the opening 624 and a second ring component along an inside perimeter of the opening 626. The structure or skeleton of the fabric panel in such embodiments can be rigid or flexible.

In some embodiments, instead of one fabric panel 600 that secures around an entire exterior of the body 604 of the robot 100, several fabric panels can each be secured to a portion of a robot exterior. For instance, a first panel can secure to a left side exterior of the robot and a second panel can secure to a right side exterior of the robot. In such embodiments, each fabric panel can include an outside ring structure located around an outside perimeter of the panel.

The fabric panel 600 illustrated in FIG. 6B and described herein can be coupled to the robot 100 and subsequently removed from the robot. Such embodiments beneficially allow for the efficient and low-cost replacement of fabric panels, for instance in the event that the fabric panels get torn or damaged. Further, implementing removable fabric panels in covering the exterior of the robot allows for the branding or configuration of the fabric panels in a color, pattern, or including a logo customized by an owner or user of the robot. However, it should be noted that while removable fabric panels are described herein, in some embodiments, the fabric panels are fixedly coupled to the robot in a more-permanent fashion. It should also be noted that although fabric panels are described herein, in other embodiments, robots can have solid/rigid outer housings and perform the functions described herein.

Mobile Robot Architecture

Figure 7:
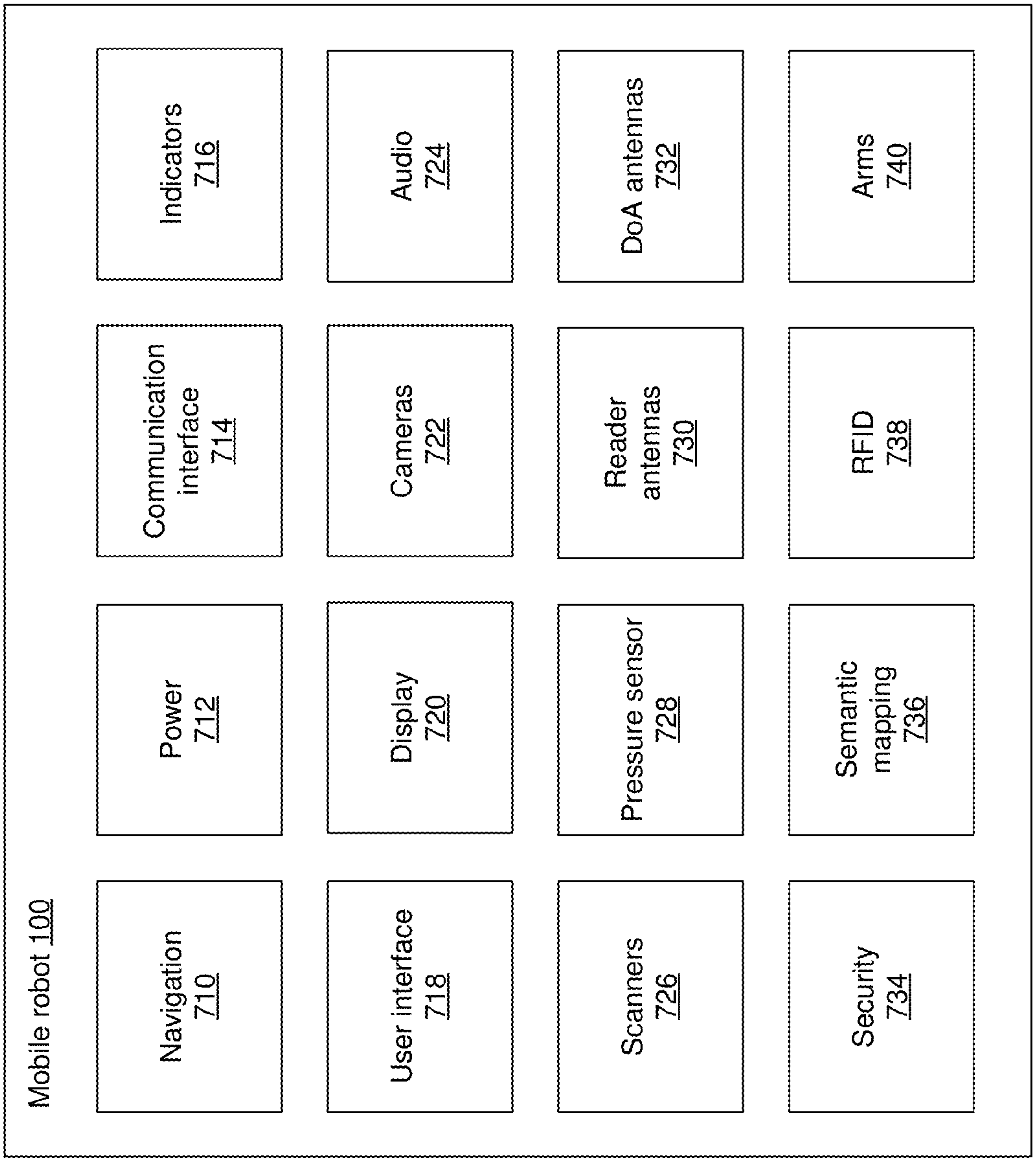
FIG. 7 illustrates a block diagram of a mobile robot architecture, according to one embodiment.

FIG. 7 illustrates a block diagram of a mobile robot architecture, according to one embodiment. The robot 100 of the embodiment of FIG. 7 includes a navigation system 710, a power system 712, a communication interface 714, various indicators 716, a user interface 718, a display 720, one or more cameras 722, an audio system 724, various scanners 726, a pressure sensor system 728, one or more reader antennas 730, one or more direction of arrival (or DoA) antennas 732, a security system 734, a semantic mapping system 736, an RFID system 738, and one or more arms 740. It should be noted that in other embodiments, a mobile robot 100 can include fewer, additional, or different components than those illustrated in the embodiment of FIG. 7. For instance, the robot 100 can include one or more hardware processors or controllers configured to perform various functionalities described herein.

The navigation system 710 is configured to move the robot 100 around a space, such as a store, a room, a floor, a building, a parking lot, or any indoor or outdoor space. The navigation system can include a motor (such as an electric motor), an engine, or any other systems capable of moving the robot. The navigation system can also include wheels, rollers, and the like configured to enable the robot to smoothly move. The navigation system can move the robot in a number of directions, for instance, forwards, backwards, or sideways. In some embodiments, the base of the robot is holonomic, enabling the robot to move in any direction. In some embodiments, the navigation system can rotate the robot clockwise or counterclockwise, for instance as much as 360 degrees. In some embodiments, the navigation system can turn the robot in place, without requiring a significant (if any) turn radius.

The navigation system 710 can move the robot 100 in response to receiving navigation instructions, for instance from a user of the central system 210, from a security personnel 250, or from another robot. In some embodiments, the navigation system moves the robot as part of a patrol, routine, or security protocol. Navigation instructions can include an end location and can determine a route from a current location of the robot to the end location, for instance by detecting obstacles and/or paths from the current location to the end location, by selecting a path based on the detected obstacles and paths, and by moving the robot along the selected path until the robot arrives at the end location. In some embodiments, the navigation instructions can include a path, an ordered set of locations, an objective (e.g., "patrol the 4th floor"), or a map, and the navigation system can move the robot based on the navigation instructions.

The power system 712 can include a power source, such as a battery, fuel, solar panels, or any other suitable source of power storage. The power system can provide power to the other components of the robot 100, such as the navigation system 710. The power system can also include a recharging system, for instance a plug/socket or other recharging interface. In some embodiments, the robot can navigate to a recharge station and can electrically couple the recharging system to the recharge station, enabling the recharge station to refill the power source of the power system. For example, the recharging system of the robot can include a socket within the robot protected by a pivoting door, and the recharge station can include a plug component. In such embodiments, the robot can navigate to the recharge station and can align the pivoting door with the plug component. The robot can then move towards the plug component such that the plug component pushes the pivoting door inward into the robot, and such that the plug component is inserted into the socket. The plug component can provide power to the power source via the socket. The power system can further include infrastructure electrically coupling the power system to the recharging interface and the other components of the robot.

The communication interface 714 can communicatively couple the robot 100 to other components of the environment of FIG. 2, such as the central system 210 or other robots, either directly or via the network 200. For instance, the communication interface can include receivers, transmitters, wireless controllers, and the like, and can receive information from and transmit information to and between components of FIG. 2 and other components of the robot. Examples of communication protocols implemented by the communication interface include WiFi, Bluetooth, Zigbee, 3G/4G, LTE, or any other suitable communication protocol. The communication interface can provide video captured by the cameras to an external monitor, or can receive instructions from an operator (for instance, via the central system).

In some embodiments, the robot 100 can choose to transmit information via the communication interface 714 based on a communicative status of the robot. For instance, in embodiments where the robot is patrolling a route within a building, the robot can transmit video and audio data captured during the patrol when the communication interface is coupled to the network 200 via a WiFi connection. In some embodiments, if the WiFi connection is lost, the robot can communicatively couple to the network via a secondary connection, such as an LTE connection. In such embodiments, the robot can modify the data sent via the communication interface before transmitting, for instance by transmitting only audio data, by performing lossy compression on the video before transmitting, by reducing the frame rate or resolution of the video before transmitting, by transmitting select images instead of video, by transmitting video data corresponding only to key events (such as video of a suspected unauthorized individual), by transmitting full-resolution video based on features within the video (such as faces) and low-resolution video otherwise, and the like. In the event of a total disconnection from the network, the robot can store information for subsequent transmission (for instance, when the communication interface is coupled to the network via WiFi or when the robot is docked at a charge station). Likewise, the robot can select data to transmit or can perform compression operations on the data before transmission if the bandwidth available to the robot falls before a threshold required to stream the data in real-time or other threshold. In some embodiments, the robot can store all detected information and data, for instance at full-resolution, for a set amount of time, until the robot's available storage capacity falls below a threshold, until the data is transmitted, until an operator instructs the robot to delete the data, or until any other suitable criteria is satisfied.

The indicators 716 can include visual indicators (such as LEDs or other lights), audio indicators, haptic indicators, vibration components, and the like. The indicators are configured to communicate information or a status associated with the robot 100 to an entity external to the robot, such as a user or individual. For instance, the indicators can include a ring of LEDs around a top surface of the robot that indicate a direction of movement of the robot. Likewise, LEDs can function as a turn signal, indicating a future direction change of the robot. The robot can also display emoji or other indicators of emotion, can display text identifying a status or current operation of the robot (e.g., "patrolling", "security alert", "danger alert", "intruder nearby", etc.) In some embodiments, lights or LEDs on the robot can change color to indicate a status of the robot (for instance, LED indicators can be green to indicate that the robot is available to assist customers, can be blue to indicate that the robot is busy performing a task, or can be red to indicate that the robot has detected a violation of a security policy). The robot also includes a hardware display 720 (such as a monitor or screen) configured to communicate information associated with the robot. For instance, the hardware display can display a map, images, a request (e.g., the text "How can I help you today?"), or any other suitable information. In embodiments where the hardware display is a touch-screen display, a user can interact with the displayed information, for instance to get additional information, to configure the display of information, to instruct the robot to perform an operation, and the like.

The robot 100 includes a user interface 718 configured to display information to an individual or user, for instance in response to a received request. In some embodiments, the user interface displays a graphic user interface ("GUI") including the information, for instance on the hardware display 720 or via the indicators 716. The GUI can display information detailing a status of the robot, information requesting credentials or other information from an individual, information providing instructions to a user (e.g., "follow me"), information associated with an environment or building in which the robot is located (e.g., store or product information), or any other suitable type of information. The user interface can also include infrastructure to enable a user or individual to interface with the robot. For instance, the user interface can include a keyboard or keyboard, one or more buttons or dials, a mouse, motion/gesture detection capabilities, and the like. In some embodiments, the user interface includes the hardware display, and the hardware display is a touch-sensitive display configured to receive inputs from an individual. Inputs received via the user interface can be provided to one or more other components of the robot, can configure the robot to perform various functions or to operate in various modes, and the like. In some embodiments, the user interface further configures a voice recognition engine configured to recognize a user's voice, enabling a user to speak to the robot (for instance, to request information, to command the robot to perform an security operation, or the like).

The cameras 722 can include any number of cameras or camera arrays. For example, the cameras can include cameras configured to capture images or videos directly or a distance in front of the robot, to the sides of the robot, behind the robot, or above the robot. In some embodiments, the cameras can move, pivot, tilt, pan, or rotate, for instance in response to a change in motion by the robot, in response to an instruction received by the robot, in response to detecting an object within a proximity of the robot, or in response to the performance of a security or other function by the robot.

The cameras 722 can capture images and video at any suitable resolution or frame rate. In some embodiments, an array of fixed cameras can capture video 360 degree video around the robot 100, while in other embodiments, one or more cameras can rotate around a central axis of the robot to capture 360 degree video. In some embodiments, camera pairs can capture 3D video, and in some embodiments, images or video captured by multiple cameras can be stitched together using one or more stitching operations to produce a stitched image or video. In addition to capturing images or video in the visible light spectrum, the cameras can capture images within the IR spectrum or can capture thermal images. Images and videos captured by the cameras can be provided to one or more other components of the environment of FIG. 2, for instance the central system 210 via the communication interface 714 and the network 200, beneficially enabling a remote operator of the robot to see the surroundings of the robot.

The audio system 724 can include components to capture and emit audio signals. For instance, the audio system can include one or more microphones configured to capture audio signals, such as audio signals that pass through the fabric panel 600 of the robot 100. Likewise, the audio system can include speakers configured to playback audio or sound to individuals within a proximity of the robot. In some embodiments, audio captured by the audio system can be provided to a component of FIG. 2, such as the central system 210 via the network 200 and the communication interface 714, beneficially enabling a remote operator of the robot to hear audio occurring within a proximity of the robot. Likewise, audio can be received by the audio system from an external entity for playback by the audio system, for instance voice commands from an operator of the robot to an individual within a proximity of the robot.

The scanners 726 can detect objects, obstacles, paths, or individuals within a proximity of the robot 100. Examples of scanners include laser scanners or rangefinders, radar, sonar, ultrasonic sensors, motion detectors, 3D depth sensors, thermal scanners, infrared or ultraviolet scanners, and the like. One or more scanners can be located near a base of the robot, for instance to identify objects that might obstruct or disrupt movement of the robot. One or more scanners can be located near a top of the robot, for instance to identify the immediate surroundings of the robot, beneficially enabling the robot to "see" over objects that might otherwise obstruct the viewpoint of scanners located near the base of the robot. In addition to detecting obstacles, objects, and individuals, the scanners can track moving objects or individuals, for instance to follow the movement of suspicious individuals. In some embodiments, information captured by the scanners is used by the navigation system when selecting a path of motion for the robot. Likewise, information captured by the scanners can be used by or provided to other components of the robot or an entity external to the robot (such as a component of FIG. 2), for instance via the communication interface 714.

The pressure sensor 728 can include a pressurized tube located around a base of the robot 100, and can detect objects or other obstructions within an immediate proximity of the robot in response to a determination that the robot has run into the object or obstruction. For instance, a robot can move down a hallway, and can inadvertently run into an individual's foot. In response to the contact with the user's foot, the pressure inside the tube increases, and the pressure sensor can detect the increase in pressure and determine that the robot has made contact with an obstruction.

In response to a detected increase in pressure within the pressurized tube, the pressure sensor 728 can determine that the robot 100 has come into contact with an obstruction, and can slow or stop the motion of the robot, for instance by instructing the navigation unit 710. The pressure sensor can determine the direction of the obstruction based on the current direction the robot was moving at the time of the detected pressure increase. In some embodiments, the pressure sensor includes a protective outer housing that, upon contact with an obstruction, exerts a reciprocal pressure on the pressurized tube for detection by the pressure sensor. The pressure sensor enables the robot to immediately detect contact with an obstruction and adjust a trajectory or movement of the robot, beneficially reducing the risk that the contact can cause damage or harm to the robot, an object, or an individual.

In some embodiments, the pressure sensor 728 can measure an amount of pressure exerted upon the pressurized tube. In such embodiments, the robot 100 can use the pressure sensor to apply an amount of force upon an object. For example, the robot may want to gently push open a door, and can move into the door until the pressure sensor detects that ten pounds of pressure are being exerted upon the pressurized tube. By measuring the amount of force applied by the robot onto an object using the pressure sensor, the robot can beneficially limit the amount of force applied to the object in order to reduce the risk that the application of force by the robot damages the object.

The robot 100 can include one or more reader antennas 730 configured to receive signals from entities external the robot (such as components of the environment of FIG. 2). The reader antennas can include any type of antenna, such as an RFID reader antenna, WiFi antennas, radio antennas, and the like. The robot can also include one or more DoA antennas 732 configured to determine a direction from which a signal is received. The reader antennas and the DoA antennas can be part of the communication interface 714, and information captured by the reader antennas and the DoA antennas can be provided to one or more components of the robot, or one or more entities external the robot (such as the central system 210).

The security system 734 configures the robot 100 to perform one or more security operations. For instance, the security system can configure the robot to investigation a suspicious sound, to obstruct the movement of an unidentified individual, or patrol a portion of a building. The security system can instruct other components of the robot during the performance of security operations, for instance by capturing video of an unidentified user using the cameras 722. The security system can receive instructions to perform the one or more security operations, and/or can receive information associated with one or more security protocols via an external source, such as the central system 210 or the security system 230. Likewise, the security system can provide information associated with the context, surroundings, or activity of the robot, or information associated with the performance of a security operation to an entity external to the robot.

The semantic mapping system 736 is configured to generate or update a semantic map associated with a location or setting in which the robot 100 is located. For instance, the semantic mapping system can generate a map associated with a patrol route through a building floor as the robot moves through the space. The location of obstructions, and paths within the building floor can be detected by the scanners 726 and recorded onto the semantic map. Likewise, objects can be detected during the robot's movement (for instance, by the cameras 722), and information describing the detected objects and the location of the detected objects can be included within a semantic map. Semantic maps generated or updated by the semantic mapping system can be provided to an entity external to the robot, for instance the central system 210, for storage and/or subsequent use. The generation of semantic maps by the semantic mapping system is discussed in greater detail below.

The RFID system 738 can identify RFID tags within a space and determination the location of the identified RFID tags. For instance, for store inventory objects, each tagged with an RFID tag, the RFID system can, during the course of movement within a proximity of the objects, detect the presence and location of the RFID tag (and thus, the object to which the RFID tag is coupled). The detected RFID tags and corresponding objects can be mapped onto a semantic map, and/or information associated with the detected RFID tags and the locations thereof can be provided to an entity external to the robot 100, such as the central system 210, for subsequent storage. In some embodiments, the RFID system can include short-range RFID readers capable of reading LF RFID or HF RFID tags from within a threshold distance, while in other embodiments, the RFID system can include long-range RFID readers capable of reading UHF RFID tags from greater than the threshold distance away but within a greater, second threshold distance. It should be noted that the RFID system can also read other types of tags according to the principles described herein, including NFC tags or devices, BLE tags or devices, and the like. The RFID system is described below in greater detail.

Figure 8:
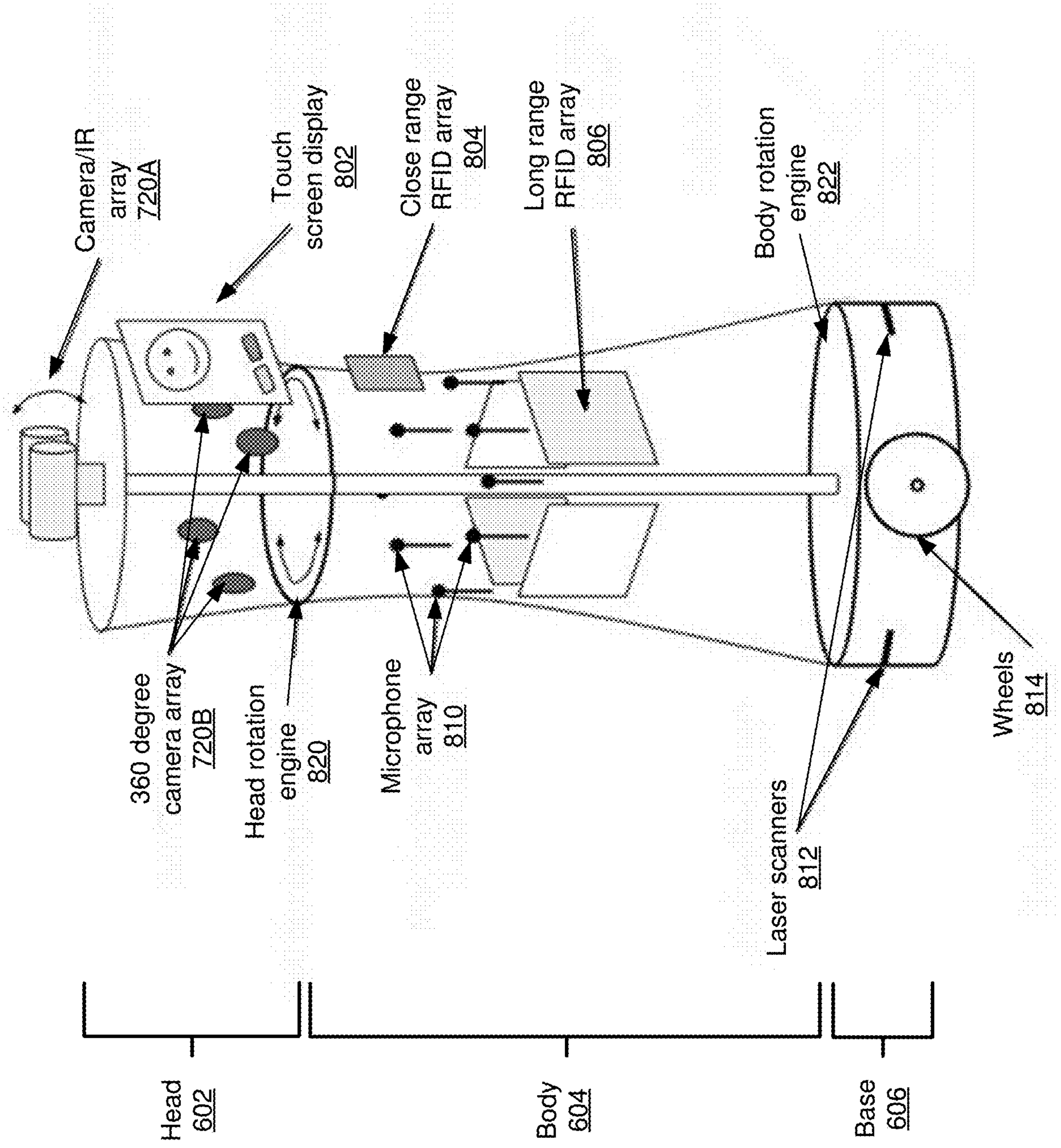
FIG. 8 illustrates a view of an example mobile robot and various robot components, according to one embodiment.

FIG. 8 illustrates a view of an example mobile robot and various robot components, according to one embodiment. The robot of FIG. 8 includes a head 602, a body 604, and a base 606. In the embodiment of FIG. 8, the head can rotate relative to the body without otherwise requiring rotation or movement by the robot via the head rotation engine 820. Enabling the head to rotate independently of the rest of the robot can beneficially enable the robot to rotate components coupled to the head, such as the camera/IR array 720A, the 360 degree camera array 720B, and the touch screen display 802. In other words, by rotating the head, the cameras and display of the robot of FIG. 8 can face different directions, allowing the cameras to capture video from a different field of view and allowing the robot to turn the touch screen display such that it faces an individual within a proximity of the robot.

In the embodiment of FIG. 8, the body 604 of the robot 100 can similarly rotate relative to the base 608 via the body rotation engine 822. Enabling the body 604 to rotate independently of the base can beneficially enable components coupled to the body to rotate, such as the close range RFID antenna array 804, the long range RFID antenna array 806, and the microphone array 810. In such embodiments, the antenna and microphone arrays can capture or detect signals from different directions, beneficially enabling the robot to optimize the angle of the antenna and microphone arrays relative to the signals captured or detected.

The base 608 of the robot 100 can similarly rotate, for instance using the navigation system 710. Rotating the base beneficially enables the robot to face different directions, to adjust an angle or trajectory of the robot, and the like. Likewise, rotating the base also rotates the laser scanners 812, beneficially enabling the laser scanners to scan in different directions. It should be noted that in some embodiments, the base can rotate while the body and 604 and head 602 of the robot do not rotate. For instance, the base can rotate 90 degrees counterclockwise, and the body can synchronously rotate 90 degrees counterclockwise, resulting in a rotation of the base 90 degrees relative to the floor without the rotation of the body and head relative to the floor.

The robot 100 can also include additional components not illustrated in the embodiments of FIGS. 7 and 8. For instance, the robot can include one or more projectors configured to project an image onto a floor or surface within a proximity of the robot. For example, the projectors can project a navigation symbol (such as an arrow) onto the floor to indicate to a user that the user should proceed in a particular direction indicated by the navigation symbol. Likewise, the projector can indicate a status or instruction, for instance instructing an individual to present a badge, presenting an indication that the user was authenticated or that the authentication failed, instructing the individual to stop moving, asking the individual if they need assistance, highlighting a requested product or object, and the like. The projectors can further project text, pictures, or icons associated with the robot or security information. For example, if a robot is guarding a passageway to prevent unauthorized users from entering the passageway, the robot can project a stop sign along with text indicating that the passageway is closed. The robot can also include a laser pointer, for instance to indicate a location of a product within a store.

The robot 100 can include one or more arms 740 for interacting with objects or individuals within a proximity of the robot. The arm can be an extendable boom arm, for instance that folds up against or retracts into the robot body when not in use. The robot arms can be used for instance to receive an object from or present an object to an individual, to press an elevator button, to move an object, to open or close windows or doors, to lock or unlock windows or doors, and the like. In some embodiments, a robot arm can include a camera, RFID reader, or other al. In such embodiments, the robot arm can be positioned or extended in order to provide a better position or vantage point for the camera, RFID reader, or other sensor. For example, an extendable robot arm equipped with a camera can be extended to capture video on the other side of an obstruction or wall, or to capture video of an area or crowd from a better vantage point. In embodiments where a robot arm is extended, the robot may reposition or balance itself to compensate for the shift in the center of gravity of the robot, for instance using inertial sensors (such as 3-axis gyroscopes, accelerometers, or magnetometers). The robot arm is described below in greater detail.

The robot 100 can also include one or more of: a spotlight or other lighting system for illuminating a room or area, strobe lights or other flashing lights to ward off intruders or otherwise deter particular behaviors of individuals, GPS receivers, sirens or alarms (which may be included within the audio system 724), beacon components configured to alert other robots, non-lethal deterrent components (such as tasers, tranquilizers, nets, tear gas, and the like), force or torque sensors (to detect the position and strength of contact between the robot and the environment or individuals within a proximity of the robot), civilian or police radios, fire extinguishers, emergency/assistance buttons or other interfaces (that enable users to call for help), emergency stop buttons or other interfaces (that enable users to immediately stop the movement of the robot), temperature sensors, light sensors, chemical/gas sensors, actuators configured to move any other components of the robot, or any other suitable components.

It should also be noted that the robot 100 includes component necessary to communicatively couple and control the components of the robot, including but not limited to: on-board computers, controllers, and processors; electric circuitry (e.g., motor drivers); computer memory; storage media (e.g., non-transitory computer-readable storage mediums, such as flash memory, hard drives, and the like); communication buses; cooling or heat dissipation systems; and the like.

Security Functions

As illustrated in the environment of FIG. 2, a set (or fleet) of robots can be deployed within a particular space, such as a building, a building floor, a campus, and the like. The set of robots 100 can be controlled by one or more robot operators, for via the central system 210 or the remote access interface 240, and can perform various security operations, for instance to augment existing security systems. For instance, an operator can directly instruct robots to perform various security operations via the robot interface 314 of the central system, or can implement one or more security protocols that include the performance of security operations by robots via the security engine 318. Likewise, a robot can perform one or more security operations, for instance in response to receiving an instruction from an operator or from the central system. A robot can receive instructions to perform security operations from the security system 734, for instance autonomously (without explicit instructions from an operator or other external entity) during the normal course of operations, for instance as part of a patrol routine, or in response to detecting suspicious activity or other circumstances that trigger one or more criteria for performing security operations.

The robot 100 can interact with one or more hardware systems or other infrastructure of a building, campus, site, or the like. An example of such hardware systems includes a camera array. The camera array further includes a wireless transceiver configured to receive information from the robot (for instance, instructions to record video or to change a field of view of the camera array, or audio to play over the speaker array) and to transmit information to the robot (for instance, video captured by the camera array streamed in real-time, or audio captured by the microphone array). The camera array can be connected to the robot through a building network, such as the network 200. The camera array can be physically attached at various locations within a building, for instance to a ceiling or wall in each of a set of rooms of a building, in areas with strategic vantage points, or near hallways, doors, or entry points.

The central system 210 can interact with one or more robots 100 and other infrastructure systems 220 and security systems 230 to perform one or more security operations. The central system can receive data from the one or more robots, infrastructure systems, and security systems; can aggregate, normalize, or otherwise format the received data; and can display the formatted data within an interface. Security interfaces are described below in greater detail. The central system can also request particular data from particular robots, infrastructure systems, or security systems; can instruct robots, infrastructure systems, and security systems to perform one or more security operations, either independently or in concert with other robots, infrastructure systems, or security systems; or can implement one or more security policies. It should be noted that the functions of the central system described herein can be performed in response to input from a user or operator of the central system, or without receiving inputs from a user or operator (for instance, autonomously or in response to detected security criteria that trigger the performance of security operations).

The central system 210 can aggregate sensor data from one or more robots 100, infrastructure systems, or security systems. For instance, the central security system can receive locations of individuals within a building from multiple robots and security cameras, and can combine the location information to determine refined locations of each individual within the building. Likewise, the central system can interpolate data received from multiple sources, for instance by averaging temperatures detected in each room in a building to determine an average temperature for each room. Finally, the central system can receive information describing a state of one or more objects in a location, for instance the power levels, capabilities, or locations of each robot within a building.

The central system 210 can manage multiple maps for a location, for instance stored building maps and blueprints, semantic maps describing a building or area, and simultaneous location and mapping (or "SLAM" maps) generated by a robot 100 or other system configured to scan a location or area. In some embodiments, the central system can coordinate between multiple maps of the same location, for instance by updating older maps to include the location of objects that newer maps indicated have moved, or by incorporating types of information present in a first map but not a second map into the second map (for instance, the location of windows, whether a door is locked or unlocked, or the location of security cameras).

The central system 210 can implement one or more security policies, such as a building security policy. For instance, a security policy can specify one or more security criteria, such as: patrol routes within a building, can specify a frequency of patrolling each route, can specify access credentials required for an individual to be in one or more portions of the building, can specify acceptable threshold values or ranges for sensors within the building (such as minimum or maximum temperatures, sound magnitudes, characteristics of video data captured by cameras), can specify acceptable or forbidden actions or activities for individuals within one or more building portions, can define geofences describing portions of a building that can be accessed or that are off-limits (for instance, by time, by access credential), and the like. In some embodiments, the security criteria are time-dependent, and can vary based on whether the current time falls within a time range specified for the security criteria.

In implementing the security policy, the central system 210 can instruct one or more robots 100 to perform a task (such as patrol a route or intercept an individual that isn't authorized to be in a particular location), can instruct security cameras to change viewpoint and/or capture video of a location associated with a potential violation of a security policy, can request sensor data detected by one or more infrastructure systems 220 or security systems 230, and the like. In some embodiments, security policies can be implemented in response to the detection of one or more security criteria. For instance, if an individual is detected in an off-limits portion of a building or a suspicious sound is detected, the central system can dispatch one or more robots or security personnel to investigate.

As noted above, the central system 210 can also instruct one or more robots 100 and/or one or more infrastructure systems 220 or security systems 230 to perform a security operation in response to a request from a robot, in response to receiving information from a robot (such as information indicative of a security violation or threat), or in response to a request or information from an infrastructure system or security system. The central system can prioritize security operations, and can instruct the one or more robots, infrastructure systems, and security systems to perform security operations based on the priority of each security operations. For instance, if the central system identifies ten security operations that need to be performed by five robots, the central system can prioritize the ten security operations, and can instruct the five robots to perform the five highest priority operations first, and when those operations are complete, can instruct the robots to perform the remaining five security operations. The central system can account for the capabilities and availability of each robot, infrastructure system, and security system before instructing these robots and systems to perform security operations. For instance, the central system can determine that of two robots, a first is able to perform a particular operation (such as an IR scan) and a second isn't, and can instruct the first robot to perform the operation (and not the second, even if the first robot is currently occupied).

The central system 210 can record and store data received from one or more robots 100, infrastructure systems 220, and security systems, for instance within log files in memory accessible to the central system. In addition, the central system can report or log any suspicious activity, detected security anomalies, detected threats or alerts, or any potential or actual violations of security policies, for instance to security personnel 250 or to an operator or user of the central system. The central system can also coordinate communications between components of the environment of FIG. 2, for instance by receiving messages from one or more of the systems and routing the message if needed to one or more other systems. In doing so, the central system can synchronize information, for instance by applying time stamps to the information, by aggregating the information by time, and by routing messages in chronological order based on the time of the aggregated information or based on the time each message was received.

As noted above, an implementation of the central system 210 can present a security interface to an operator. The operator can review data provided by the robots 100, infrastructure systems 220, and security systems 230 and presented within the interface. The information presented by the security interface can be updated in real-time, for instance reflecting updated information received from the robots, infrastructure systems, and security systems. For example, the security interface can update the location of the robots within a building in real-time. The operator can coordinate the actions of multiple robots, can assign patrol routes to robots and can alter patrol routes as the robots are patrolling the routes, can dispatch robots to investigate security anomalies or suspicious activity, and can assign particular security operations to particular robots.

The central system 210 can notify security personnel 250 or other individuals or groups to inform the security personnel of security violations, suspicious activities, security anomalies, and the like. For instance, the central system can send text or SMS messages, emails, or voice calls to security personnel, to police, to a company's employees or managers, and the like. Likewise, the central system can field queries from robots 100, infrastructure systems 220, security systems 230, security personnel 250, users of a remote interface 240, and the like, and can provide information gathered by the central system in response to the queries. For example, the central system can provide a map of all RFID readings as detected by a fleet of robots to a requesting entity. Likewise, the central system can store and provide a WiFi heat map, a temperature map, and the like to users of the central system, and can generate (either periodically, automatically, or in response to user request) reports of anomalies, security events, patrol coverage, or building properties for review by users of the central system.

In some embodiments, the robots 100 may not include the necessary computing power to perform certain functions (or may include the necessary computing power but may not be able to perform such functions in a time-efficient manner), including both security operations (such as facial detection) and non-security operations (such as national language processing). In such embodiments, the robots can request that the central system 210 (which may include greater processing capabilities and resources) to instead perform such functions. For example, a robot can receive a request from a user asking "How do I get to the conference room?", and can send the recorded voice sample to the central system, which can parse the voice signal and determine the user's intent. Continuing with this example, the central system can identify a set of navigation instructions to the conference room to the robot, and the robot can provide the navigation instructions to the user. Likewise, a robot can request that the centralized server compress data, perform video processing tasks, to stream video to other robots or entities, to perform machine learning tasks, or to perform any other processing- or resource-intensive tasks, and can provide the data to perform such tasks to the central system. The central system can also access a building's or company's databases or processing resources (such as servers or other computer systems), for instance to identify an individual within a building or to use the accessed processing resources to perform a computationally-intensive task.

Although the central system 210 is described herein as a single entity, it should be noted that in some embodiments, the central system can include any number of systems operating in concert. For instance, the central system 210 can be implemented within a data center, by several communicatively coupled servers, or the like. Finally, it should be noted that in some embodiments, the tasks performed by the central system may instead be performed by other components of the embodiment of FIG. 2, by systems configured to directly communicatively couple with each other (for instance, the robot 100 and a security camera system), or by two or more robots configured to communicatively couple with each other.

The robot 100, in response to determining that the robot has lost connectivity with the network 200 during the patrolling of a route (for instance, while patrolling in a dead zone or while the robot is using an elevator), can return to an earlier location with the route where the robot was connected to the network. Likewise, in some embodiments, the robot can move to a location further along the patrol route until connectivity is restored. While the robot is disconnected from the network, all data connected by the robot (related to security or otherwise) can be stored until connectivity is restored. When the robot is able to reconnect to the network, the robot can upload the stored data (for instance, to the central system 210). For example, the robot may lose connectivity with the network 200 while in an elevator. Details with on actions taken by the robot when losing connection is discussed below with respect to FIGS. 12A-12C.

In some embodiments, the robot 100 can determine its location without using a map (for instance, in response to a mapping error). For instance, the robot can ask a nearby human for help, can use RFID tags found in a vicinity of an area and can identify a historical location of the RFID tags, can ask nearby robots for location information, can query the central system 210 for the robot's location, can use 3D information or 2D/map layout information to determine the location of the robot, and the like.

As noted above, the robot 100 can perform operations in addition to security operations. For instance, the robot can be located within an entrance or doorway and greet people as they enter or leave an area. The robot can request janitorial service in response to detect a mess within a proximity of the robot, and can act in self-defense in the event that someone tries to tamper with the robot or with another security system or infrastructure system.

In some embodiments, the robot 100 can delivery objects, packages, paperwork, and the like to an individual, for instance by querying a map, the central system 210, another robot, or any other system or entity that tracks the location of individuals. In response to identifying a location of the individual, the robot can navigate to the individual, can verify the individual's identity (for instance, by scanning an RFID badge of the individual, by performing facial or voice recognition on the individual, or by any other suitable means), and can have the individual sign for the delivery before providing the object to the individual. In some embodiments, the robot can enable guests to check-in via the robot's touchscreen display. In other embodiments, the robot can enable individuals near the robot to report emergency situations, for instance a fire nearby, an unauthorized individual within the vicinity, a medical emergency, and the like.

It should be noted that in the examples of robot functionality described above, an exhaustive list of security operations that a robot can perform is not given for each example for the purposes of simplicity. However, it should be noted that any security operation described herein or otherwise can be performed by the robot in any context described herein, and that the lack of description of a particular security operation in a particular context does not indicate that the robot is unable to perform the security operation in that context.

Semantic Mapping

As noted above, the semantic mapping system 736 of the robot 100 can generate or update a semantic map associated with a location or setting in which the robot is located. As used herein, a "semantic map" refers to a map that includes one or more objects, entities, or individuals, and that includes a meaning, description, identity, or status of the identified objects, entities, or individuals. Semantic maps generated by the semantic mapping system can be stored locally by the robot, or can be uploaded to the central system 210 for storage in the semantic maps storage module 342.

In some embodiments, the robot 100 can generate a semantic map from scratch, while in other embodiments, the robot can update an existing semantic map or can generate a semantic map from a non-semantic map, for instance by adding semantic details (such as information describing the location, identity, status, or other characteristics of detected objects) to the non-semantic map. In embodiments, where the robot generates a semantic map from scratch, the robot first generates an area map identifying obstacles and pathways using, for instance, one or more of the scanners 726 (such as a laser rangefinder or other suitable depth sensor) and a simultaneous localization and mapping (or "SLAM") algorithm. As used herein, such maps are referred to as "SLAM maps".

While SLAM or other areas maps ("non-semantic maps" hereinafter) can be useful for the purpose of robot navigation within an area, the rangefinders or depth sensors used by the robot 100 to generate the SLAM map do not generate information about what detected obstacles or objects are, or how the robot should handle or interact with the detected obstacles or objects. The robot can detect and classify or identify objects, and can determine a state or other characteristics of the objects. Information describing the classified/identified objects and the corresponding detected states or other characteristics of the objects are stored in conjunction with the non-semantic maps, in association with a location of the objects relative to the non-semantic map. The generation of a semantic map refers to the inclusion of information describing objects represented within the map (and their corresponding detected states and characteristics).

In some embodiments, objects can be detected and identified by the robot 100 using one or more sensors, for instance cameras, RFID readers, IR sensors, and the like. For example, the robot can capture an image of an object, and can apply image detection or classification algorithms to identify the object type. Likewise, the robot can analyze images of the object to determine a state of the object. For instance, if the robot detects a door, the robot can also detect whether the door is open or closed. In some embodiments, the identification of objects and object states or characteristics can be manually provided by a system administrator, a robot operator, an employee or individual associated with the robot, and the like. In some embodiments, the robot can access object identification and state information from a repository of object information, such as a building database identifying the location and expected state of various objects within the building. In some embodiments, object information can be received from other robots that have scanned locations and identified objects within the locations. Object information can also be received from accessing the central system 210, one or more infrastructure systems 220, or one or more security systems 230. For instance, for a smart door, the robot can query the state of the smart door (e.g., locked or unlocked) via the network 200. Likewise, the robot can query a building elevator system to determine the current floor of an elevator.

Examples of detected objects and corresponding object states and properties (if applicable) include:

Doors: open/closed, locked/unlocked, required security credentials to unlock

Windows: open/closed, locked/unlocked, broken

Elevators: number, current floor, button location, the date of last inspection (determined by scanning text of an inspection certificate within the elevator)

Stairs: number of floors

Bathrooms

Lights: on/off, location of light switch, in need of replacing (burnt out bulbs)

Plumbing/piping locations: water damage/leaks

Trashcans/recycling bins/compost bins: last emptied, in need of emptying

Rooms: room type (such as office, kitchen, conference room, bathroom, common area, game room, storage closet, guard station, laboratory, computer room, utilities room, and the like), room number, locked/unlocked, required security credentials to access, normal temperature range, current occupancy Access devices: lock types, card readers, RFID readers Conference rooms: in use/reserved/free, Fity, conference room assets (desk, number of chairs, computer equipment, monitor/display/projector, white board), room number Desks: owner, equipment (chair, computer, computer dock)

Walls: type (glass, plaster, moveable, etc.), location of doors within walls

Building structural obstacles (such as pillars, columns, etc.)

Thresholds: geofences, boundaries between rooms, access credentials required to cross Ramps Hallways

- Kitchens: available equipment (microwaves, refrigerators, sinks, water fountain, ice machine, tables, chairs, etc.)
- Water fountains
- Fire extinguishers: the date of last inspection
- Smoke alarms: the date of last inspection
- Fire sprinklers or other fire suppression systems: the date of last inspection
- Vents
- Power outlets
- TVs and monitors
- Computers and computer equipment: printers, servers, keyboards, keypads, tablets
- Network equipment: routers, switches, modems, networking cables, servers, network names, local area network equipment
- High-value assets: artwork, safes, secure document repositories or cabinets, secure computer equipment, cash registers, ATMs, lab equipment, medical equipment
- Security systems: guard stations, security cameras, access gates, audio detectors, motion detectors, aerial systems, security displays
- Robot systems: robots, charge stations, robot docks, robot patrol routes
- Infrastructure systems: temperature sensors, power systems, generators
- Retail objects: racks, displays, shelves, drawers, inventory object types, kiosks, checkout desks
- Decorative objects: paintings, sculptures, plants
- First aid kits
- Locations of frequent false positives (objects frequently identified as people, etc.)

In addition, a robot 100 can determine usage patterns of detected objects (such as any of the detected objects listed above), and information describing such usage patterns can be included within the semantic map. For instance, a robot can query a building system to determine the floors in a building most frequently visited by an elevator, can access a scheduling system of a building to determine historical usage patterns for conference rooms, or can monitor a kitchen area to determine the times of a day when the kitchen is the most crowded. Likewise, a robot can determine behavior or movement patterns of people within an area, and information describing such patterns can be included within the semantic map. For instance, a robot can query a security system to determine a list of people who frequently pass through an access gate, or can track individuals (for instance, by scanning the RFID badges of the individuals) to determine historical patterns of movement of the individuals.

The robot 100 can use a semantic map to identify infrastructure systems 220 and security systems 230 closest to a particular location. For instance, if the robot detects a potential intruder within a building at a given location, the robot can query the semantic map to identify security cameras closest to the given location, and can instruct the security cameras to look for and record video of the potential intruder. Accordingly, the robot can query a semantic map with a location to identify infrastructure or security systems closest to the location, and can perform an action (such as a security operation) using the identified infrastructure or security systems.

Mechanical Arm Designs

Figure 9A:
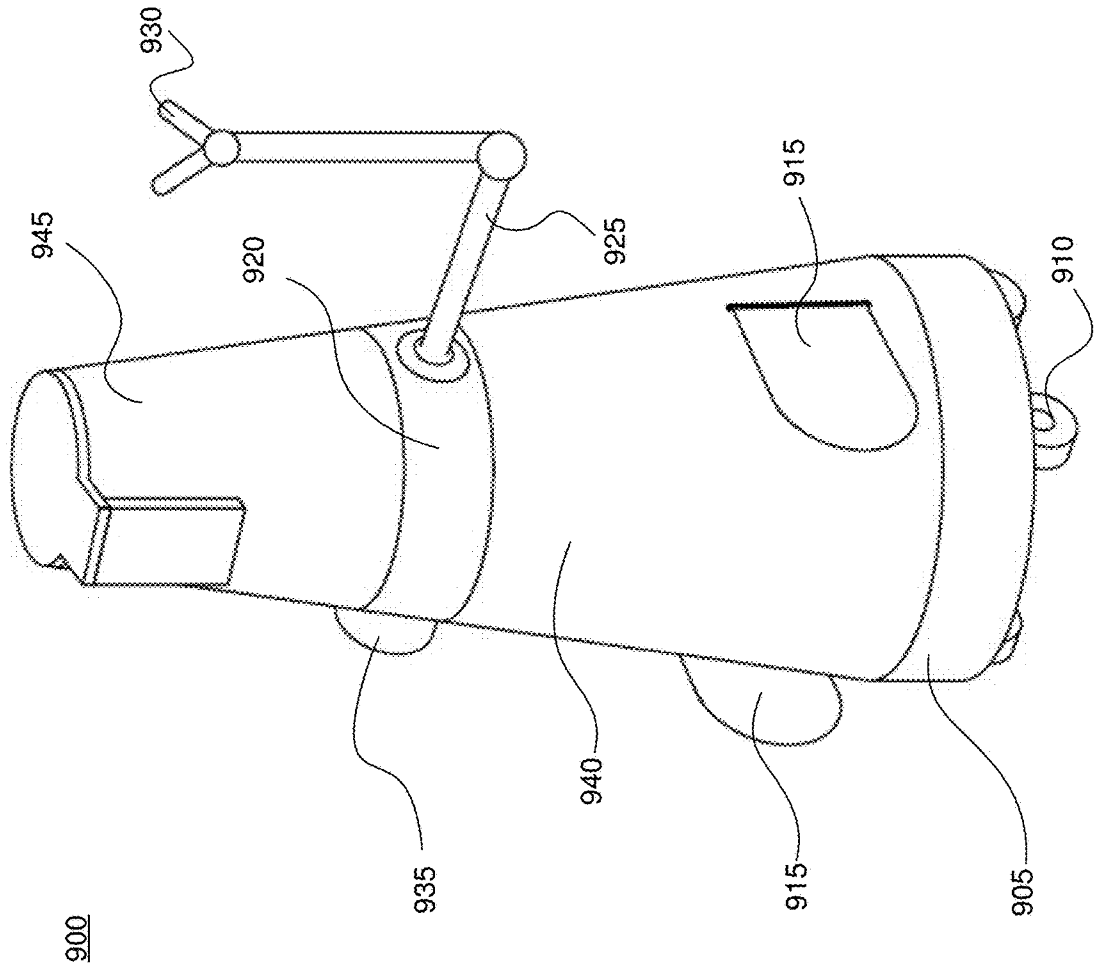
FIGS. 9A and 9B illustrate a mobile robot with a mechanical arm at different positions, according to one embodiment.
Figure 9B:
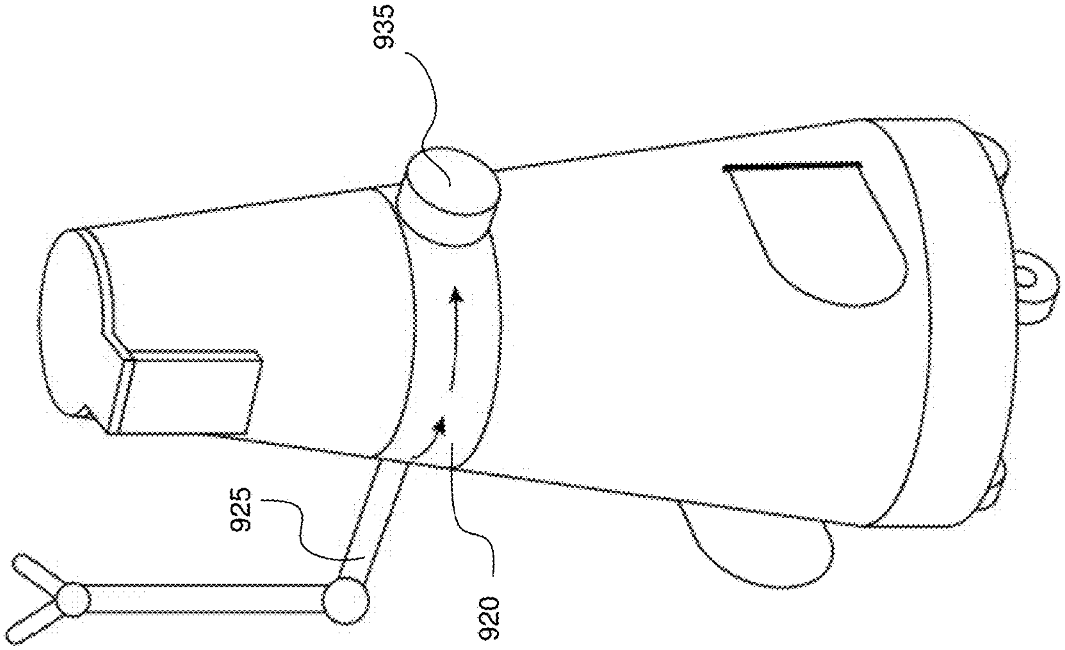

FIGS. 9A and 9B illustrate a mobile robot with a mechanical arm at different positions, according to one embodiment. The mobile robot 900 (or simply "robot" hereinafter) includes a motorized base 905, one or more wheels 910, one or more flippers 915, a rotatable ring 920, a mechanical arm 925, a mechanical hand 930, a counterweight 935, a robot body 940, and a robot head 945. In the example shown in FIGS. 9A and 9B, the robot 900 has one mechanical arm 925. However, in other examples, the robot 900 may have more than one mechanical arm 925. In some embodiments, the mobile robot 900 may include fewer, additional, or different components.

Although not shown in FIGS. 9A and 9B, the robot 900 includes components necessary to communicatively couple and control the components of the robot, including but not limited to: on-board computers, controllers, and processors; electric circuitry (e.g., motor drivers); computer memory; storage media (e.g., non-transitory computer-readable storage mediums, such as flash memory, hard drives, and the like); communication buses; cooling or heat dissipation systems; and the like. In the descriptions below, the robot 900 has one or more controllers (not illustrated in FIGS. 9A and 9B) that communicate with the central system 210, and based on the communication, control moving parts of the robot 900 such as the rotatable ring 920, mechanical arm 925, mechanical hand 930, flippers 915, and the motorized base 905. The one or more controllers can receive a request from the central system 210 that specifies a function that the robot 900 is to perform. The request may include information such as an object that the robot is to interact with, target location of the robot, and operations that the robot is to perform. The one or more controllers can also send updates to the central system 210.

The robot 900 may be a variation of the mobile robot 100, and the robot 900 may include one or more elements of the mobile robot architecture for the mobile robot 100 discussed above with respect to FIG. 7. As discussed above, the robot 900 may be connected to the central system 210, the infrastructure system 220, the security system 230, the remote access 240, and the security personnel 250 via the network 200.

The motorized base 905 allows the robot 900 to move within a geographical location using the one or more wheels 910. The motorized base 905 may be a part of a navigation system (e.g., navigation system 710) that moves the robot in a number of directions, allowing the robot 900 to perform various functions at different locations. The motorized base 905 may receive navigation instructions from the navigation system that directs the robot from a current location of the robot 900 to an end location.

The motorized base 905 can include wheels, rollers, and the like that are driven by one or more motors. The one or more motors may be connected to the one or more controllers that sets the direction, acceleration, speed, and other motion parameters based in part on the functions that the robot 900 is performing. It should be noted that in addition to moving the robot 900 throughout a location, the motorized base 905 may rotate the robot in place, without changing the location of the robot relative to the ground.

The robot 900 can include one or more flippers 915 that are coupled to a lower portion of the robot to prevent objects from blocking a trajectory of the robot 900. A flipper 915 can be a flat, paddle-like structure that extends outwards from the surface of the robot 900. However, the flipper 915 can vary in size and shape. The flipper 915 may be made of a material that can support significant force (e.g., weight of a door applied to the flipper) while being flexible and smooth such that the flipper 915 does not get caught on surrounding objects or damage the surrounding objects. For instance, the flippers 915 can include rubber, plastic, metal, composite materials, or any combination thereof. In some embodiments, the flipper 915 includes one or more rollers at a distal end of the flipper, which allows the flippers to roll along a surface abutting an extended flipper, enabling the robot to pass through narrow spaces (e.g., a narrow hallway) more easily and avoiding causing scratches in surrounding surfaces such as walls, furniture, and doors.

The flippers 915 may be coupled to the motorized base 905 or to the robot body 940. In one embodiment, the robot 900 includes two flippers 915 that are each attached to a different side of the robot 900 such that the distribution of flippers on the robot 900 is symmetrical. In another embodiment, the robot 900 can include a flipper 915 that attaches to a front surface of the robot 900 with respect to the robot body 940 and robot head 945. The flippers 915 can be attached to a lower portion of the robot 900 such that the flippers 915 are closer to the ground than to the robot head 945 to prevent the robot 900 from tipping over when force is applied to the flippers 915. In some embodiments, the flippers 915 can be controlled by a motor that causes the flippers 915 to fold against the robot 900 when the flippers are not in use and extend outward away from the robot 900 when the flippers are being used.

The flippers 915 can be used to hold a door open while the robot 900 passes through the door. The flippers 915 can also be used to move an object from one location to another location. For instance, if the robot 900 detects an object along a path that may be hazardous (e.g., a tripping hazard), the robot 900 may engage the flippers 915 to make contact with the object and then push the object to a safe location using the motorized base 905.

The rotatable ring 920 encircles and rotates about the robot body 940. The rotatable ring 920 is coupled to the mechanical arm 925 and the counterweight 935. In one embodiment, the mechanical arm 925 and the counterweight 935 are on opposite sides of the rotatable ring 920 such that the position at which the mechanical arm 925 is coupled to the rotatable ring 920 is 180 degrees away from the position at which the counterweight 935 is coupled to the rotatable ring 920. The rotatable ring 920 is configured to rotate 360 degrees about the robot body 940 in both clockwise and counterclockwise directions. The rotatable ring 920 may by coupled to a motor that rotates the rotatable ring 920 by a particular angular distance according to instructions received from a controller. Responsive to determining an action to perform, the controller may determine a current position of the mechanical arm 925 with respect to the robot 900 and calculate an angular distance between the current position and a desired position of the mechanical arm 925. Based on the calculated angular distance, the controller can drive the rotatable ring 920 until the mechanical arm 925 is at the desired position. Coupling the mechanical arm 925 to the rotatable ring 920 enables the robot 900 to be ambidextrous without having two mechanical arms 925. The robot 900 may perform both left-handed and right-handed tasks with a single mechanical arm 925 by moving the rotatable ring 920 to a desired position for performing the tasks. In some embodiments, the robot 900 may not have a rotatable ring 920, and the mechanical arm 925 is directly coupled to the robot body 940. The robot 900 may rotate the entire robot 900 via the motorized base 905 to position the mechanical arm 925 at the desired position.

The mechanical arm 925 is an extendable robot arm for interacting with objects or individuals within reach of the mechanical arm 925. The mechanical arm 925 may be divided into a plurality of arm segments. In one embodiment, the mechanical arm 925 has a first arm segment (e.g., an upper arm) and a second arm segment (e.g., a lower arm). The first arm segment can be coupled to the robot body 940 via a first joint on one end and coupled to the second arm segment via a second joint on another end. The first joint functions as a "shoulder" of the robot arm and enables the mechanical arm 925 to rotate about the first joint. The mechanical arm 925 may rotate 360 degrees in a clockwise direction and in a counter clockwise direction. The second joint functions as an "elbow" of the mechanical arm and works as a hinge that enables the second segment to bend the second arm segment towards the robot body 940 and away from the robot body 940. The second joint may allow the second segment to have at least a motion range of 180 degrees. When used in combination with the rotatable ring, the mechanical arm 925 can have six degrees or more of freedom that allows the mechanical arm 925 to change position within a three-dimensional space (e.g., forward/back, up/down, left/right) and change orientation The mechanical hand 930 is attached to the mechanical arm 925 and configured to perform actions such as grabbing and releasing an object. The mechanical hand 930 may be removable or fixedly coupled to the mechanical arm 925. The mechanical hand 930 may have one or more fingers and a wrist that connects the mechanical hand 930 to the mechanical arm 925. In some embodiments, the mechanical hand 930 is a detachable piece of the mechanical arm 925. There may be several variations of the mechanical hand 930 for different functions of the robot 900 and one mechanical hand 930 may be replaced with another mechanical hand 930 depending on the type of task that the robot 900 is performing. It should be noted that different variations of arm segments, joints, and hands than those described herein can be incorporated according the principles described herein.

In one embodiment, the robot 900 includes a plurality of mechanical arms 925. The robot 900 may include a first mechanical arm 925 that is coupled to the rotatable ring 920 at a first location and a second mechanical arm 925 that is coupled to the rotatable ring 920 at a second location. In one embodiment, the first location and the second location are separated by 180 degrees. In another embodiment, the first location and the second location are separated by an angular distance different from 180 degrees. When the robot 900 has two mechanical arms 925, the robot 900 may have two identical mechanical arms 925 or may have two different types of mechanical arms 925 that are configured to perform different motions. For example, the first mechanical arm 925 may be configured to support a high payload or supply a large amount of force, and the second mechanical arm 925 may be configured to perform tasks that involve high dexterity. The first and the second mechanical arms 925 may be coupled to different types of mechanical hands 930 that are designed for different functions, which increases the functionalities that the robot 900 can perform. It should also be noted that in some embodiments, each mechanical arm can be coupled to a different rotatable ring.

The counterweight 935 is attached to the rotatable ring 920 opposite from the mechanical arm 925 and configured to counterbalance the weight of the mechanical arm 925. The counterweight 935 may weigh less than, the same as, or more than the mechanical arm 925. The counterweight 935 can be extendable outward and away from the robot 900 to offset the moment arm of the mechanical arm 925. In one embodiment, instead of the counterweight 935, another mechanical arm 925 is attached to the rotatable ring 920 such that the two mechanical arms 925 are on opposite sides of the rotatable ring 920.

The robot 900 includes sensors and cameras for gathering real-time details of a surrounding environment. The sensors can include one or more of: a light sensor, an IR sensor, a temperature sensor, a pressure sensor, a touch sensor, a gyroscope, an accelerometer, a sound detector, and the like. The robot 900 also includes access credentials (such as a key fob, an identity card, or an RFID-enabled object). The sensors and the access credentials can be located anywhere on the robot 900 including the motorized base 905, the robot body 940, the rotatable ring 920, the mechanical arm 925, mechanical hand 930, and the robot head 945. In one embodiment, the mechanical arm 925 may include one or more pressure sensors located at different positions throughout the mechanical arm 925 configured to measure a magnitude and a direction of force applied to the mechanical arm 925 at the different positions. The mechanical arm 925 may have a plurality of pressure sensors at a contact point on an outer surface of the mechanical arm that often makes contact with another object. For example, the robot 900 can use the mechanical arm 925 to hold the door open as the robot 900 passes through the doorway in a similar way that a person may hold a door open with an elbow. A pressure sensor may be located at the second joint to measure the force applied to the second joint as the robot 900 is holding the door open.

The robot 900 may have a camera system including a plurality of cameras at different parts of the robot 900. The plurality of cameras may be positioned on the robot 900 to provide a 360 view of a surrounding environment. The camera system may include one or more depth cameras that allows the robot 900 to collar image data of the surrounding environment and calculate a distance between the robot 900 and an object, building structure, people, cars and the like. The robot 900 can include one or more cameras on the mechanical arm 925 that allows precise arm movement. In one embodiment, the robot 900 includes a camera on the mechanical hand 930, but the camera may be located anywhere on the mechanical arm 925. After collecting image data from the plurality of cameras, the robot 900 may process the image data to identify objects surrounding the robot 900 as well as the relative locations of these objects. A controller of the robot 900 may process the image data or send a request to the central system 210 to process the image data instead.

As shown in FIG. 9A, the mechanical arm 925 is at a first position relative to the robot head 945. A controller of the robot 900 may receive instructions from the central system to perform a function such as opening a door using the mechanical arm 925. The controller may generate a motion plan to put the mechanical arm 925 in a position to perform the function. The motion plan can specify a position, orientation, and force for the mechanical arm 925 as a whole or can specify a position, orientation, and force for each of the plurality of segments and joints in the mechanical arm 925. As shown in FIG. 9B, the controller of the robot 900 may rotate the rotatable ring 920 in a counterclockwise direction until the mechanical arm 925 is at a second position relative to the robot head 945, for instance without requiring any motion by the robot base 905, the robot body 940, or the robot head 945. When generating the motion plan for the mechanical arm 925, the controller can apply a set of constraints to keep excess degrees of freedom open in the motion of the mechanical arm 925. The controller may avoid generating a motion plan where joints in the mechanical arm 925 align, resulting in kinematic singularity. The controller may also restrict positions for different parts of the mechanical arm 925 to enable a larger range of motion. For example, the motion plan may prevent the second joint (e.g., the "elbow" of the mechanical arm 925) from being positioned outside of a certain height range with respect to the robot body 940 since positions outside of the range can restrict future range of movement for the mechanical arm 925. That is, the mechanical arm 925 has a wider range of motion when the second joint is kept at mid height with respect to the robot body 940 compared to the mechanical arm 925 being positioned such that the second joint is above the robot body 940 by the robot head 945.

Figure 10B:
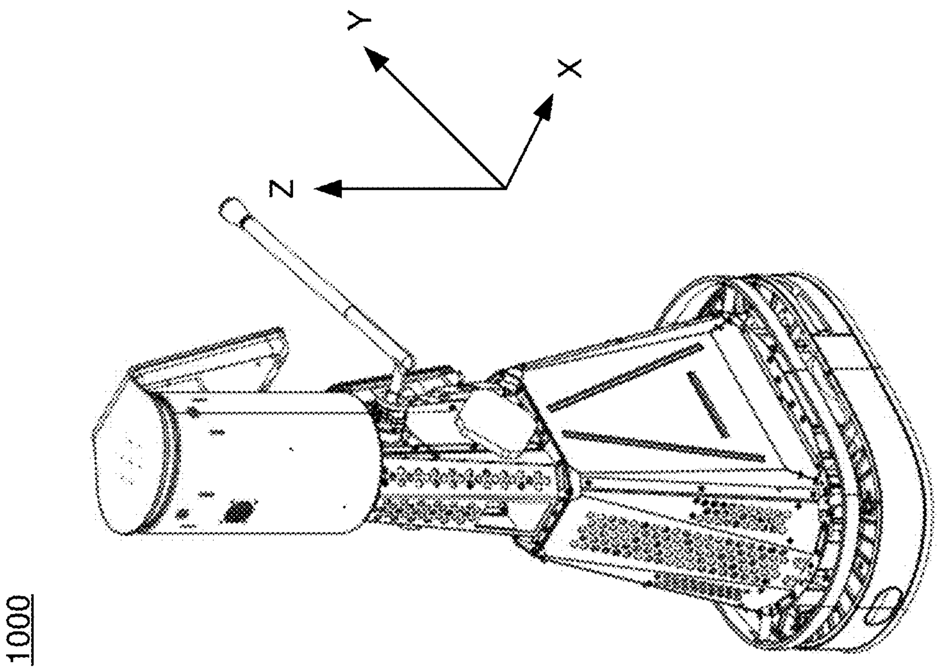
FIGS. 10A, 10B, and 10C illustrate a mobile robot with a mechanical arm shown from different perspectives, according to one embodiment.
Figure 10A:
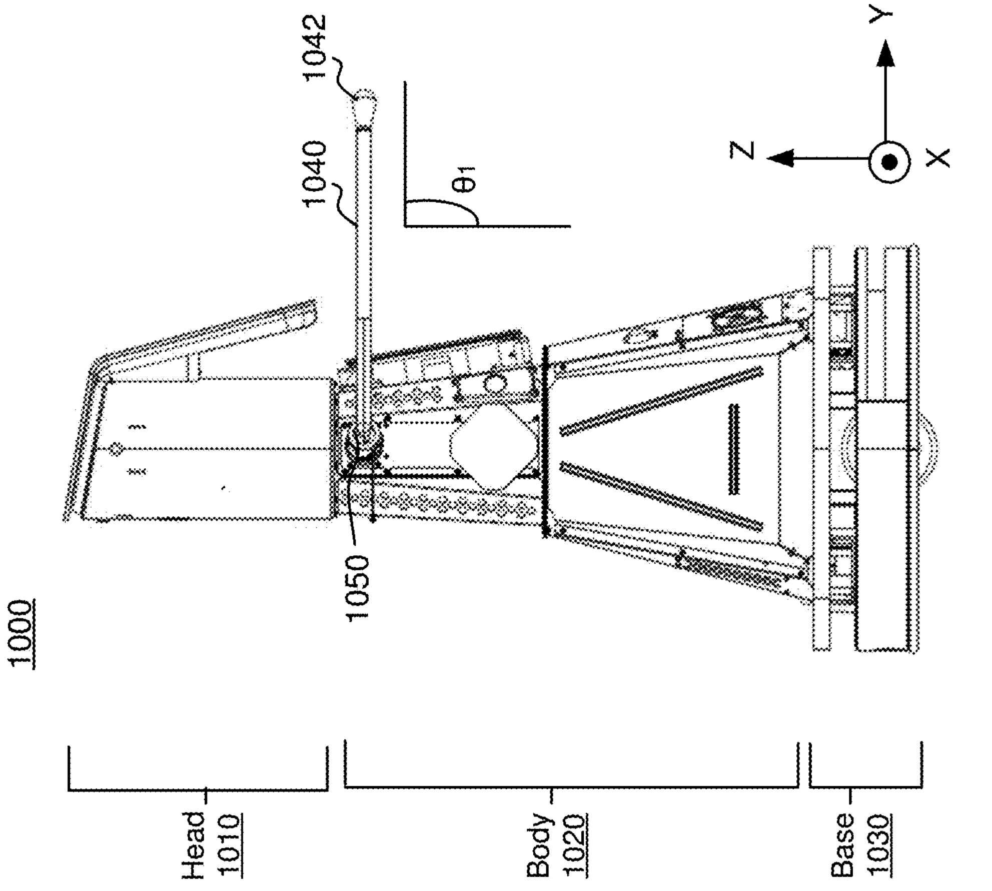
Figure 10C:
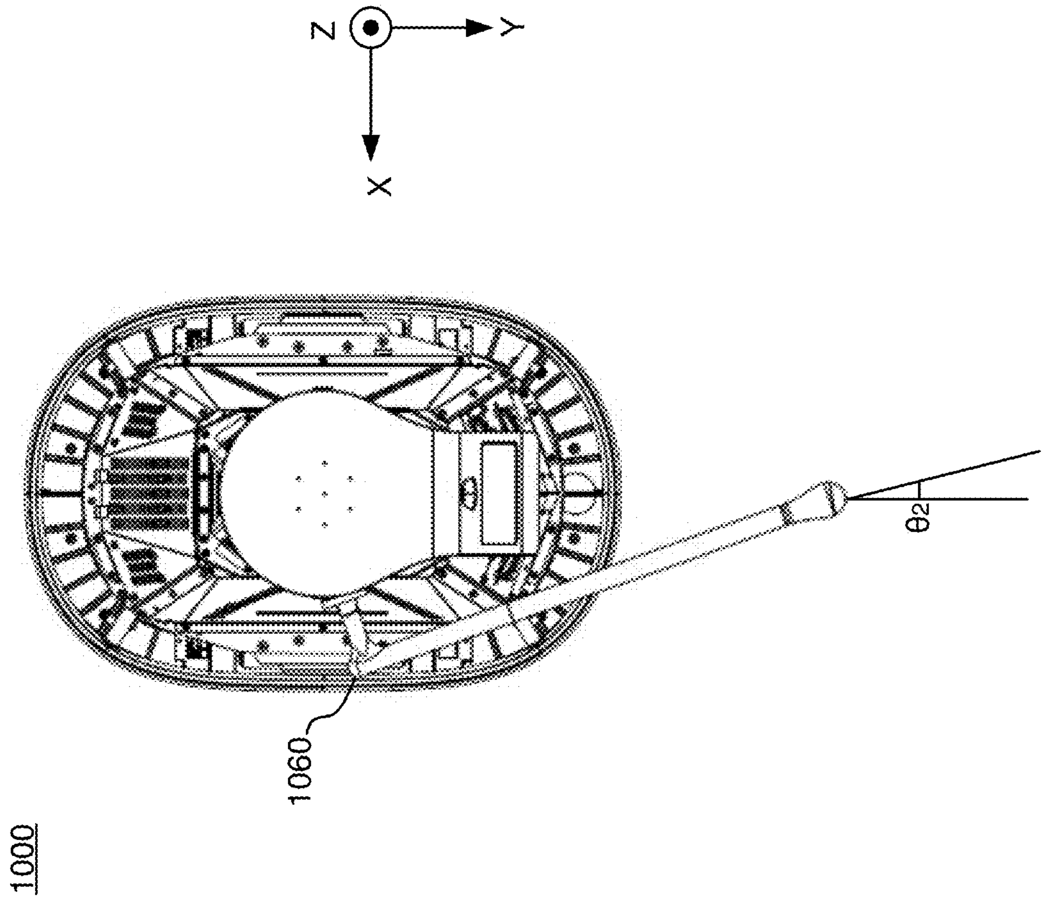

FIGS. 10A, 10B, and 10C illustrate a mobile robot with a mechanical arm shown from different perspectives, according to one embodiment. FIG. 10A is shown from a first perspective, FIG. 10B is shown from a second perspective, and FIG. 10C is shown from a third perspective. The mobile robot 1000 (or simply "robot" hereinafter) may be a variation of the mobile robot 100 and/or the mobile robot 900. Description for elements discussed above with respect to the mobile robot 100 and/or the mobile robot 900 is omitted to avoid redundancy.

The robot 1000 includes a head 1010, a body 1020, and a motorized base 1030. The base 1030 includes wheels, rollers, and the like that are driven by one or more motors. The base 1030 allows the robot 1000 to make translational and rotational movements within a geographical location. The robot 1000 includes a mechanical arm 1040 that is coupled to the body 1020 at a first joint 1050. The first joint 1050 may include a force sensor such as a wheatstone bridge sensor to detect force on the mechanical arm 1040 in three-dimensions. Additional force sensors may be placed along the surface of the arm to detect when there is contact with external object. Although not illustrated, the robot 1000 may include additional mechanical arms 1040.

In an embodiment, the mechanical arm 1040 is fixedly coupled to the body 1020 at the first joint 1050 using fasteners such as bolts and screws. In another embodiment, the mechanical arm 1040 can be coupled to the body 1020 at the first joint 1050 via one or more magnets (not shown in figures). The magnets can be embedded within the body 1020 or disposed on a surface of the body 1020 at the first joint 1050, and attractive forces of the magnets can hold the mechanical arm 1040 to the body 1020. The magnets may be placed at various locations on the body 1020. In the example illustrated in FIGS. 10A-10C, the mechanical arm 1040 is coupled to a side of the body 1020, but the mechanical arm 1040 may be coupled to other locations on the body 1020. It should be noted that the mechanical arm 1040 can include any number of joints, degrees of freedom, or functionality. The mechanical arms illustrated herein are just one example of the mechanical arms that may be used to implement the functionalities described herein. In addition to magnets, the mechanical arm 1040 may be coupled to the body 1020 by a clutch or other types of mechanical connections that release the mechanical arm 1040 when an external force above a threshold amount is exerted on the mechanical arm 1040 but can be re-attached to the mechanical arm 1040.

When an external force that exceeds the attractive force of the magnets is applied to the mechanical arm 1040, at least a portion of the mechanical arm 1040 can become disconnected from the first joint 1050 of the robot 1000. The magnets allow the mechanical arm 1040 to disconnect safely from the first joint 1050, which can prevent damage to the mechanical arm 1040 or the body 1020. Disconnecting the mechanical arm 1040 from the first joint 1050 mitigates the impact of the external force onto the first joint 1050, decreasing likelihood of damage in comparison to a configuration in which the mechanical arm 1040 is fixedly coupled to the body 1020.

For example, when the robot 1000 bumps into an obstacle such as a wall or if a human incorrectly interacts with the mechanical arm 1040 by pulling on the mechanical arm 1040, at least a portion of the mechanical arm 1040 becomes disconnected from the first joint 1050 and then reattaches to the first joint 1050 using the attractive force of the magnets. If the magnets are unable to cause the mechanical arm 1040 to properly reattach to the body 1020, the robot 1000 may send a notification to a human operator for further instructions. Although the mechanical arm 1040 may become detached from the first joint 1050, there may be a security mechanism that prevents the mechanical arm 1040 from detaching from the robot 1000 completely and falling to the ground. For example, there may be a cable that couples the mechanical arm 1040 to the robot 1000 even though the magnets may not be in contact with any portion of the mechanical arm 1040. Electrical signal between the body 1020 and the mechanical arm 1040 may be conducted through the connection between the magnets and the mechanical arm 1040, and when the mechanical arm 1040 is disconnected from the magnets, the electrical connection is disrupted until the mechanical arm 1040 is reattached. The electrical connection may be made using one or more pogo pins.

Based on hardware configurations, the mechanical arm 1040 illustrated in the embodiments herein may include up to three or more degrees of freedom (DOF) in motion within a three-dimensional space. In one example, the mechanical arm 1040 has at least one DOF in either rotational or linear motion that allows the robot 1000 to adjust a height of the end effector 1042 along the z-axis. In another example, the mechanical arm 1040 has at least two DOFs: a first DOF in either rotational movement or linear motion for adjusting the height of the end effector 1042 and a second DOF in the x-y plane. The second DOF may be either be extending and retracting the mechanical arm 1040 (e.g., forward/back motion) or pivoting the mechanical arm 1040 side to side (e.g., left/right motion). When the mechanical arm 1040 has one DOF or two DOF, the robot 1000 may use the base 1030 to implementing one or more additional degrees of freedom in the x-y plane. In some embodiments, the mechanical arm 1040 is configured to perform both extending and retracting as well as pivoting side to side, enabling the mechanical arm 1040 to move in three-dimensional space.

In one embodiment, the mechanical arm 1040 can move rotationally. The mechanical arm 1040 can be coupled to a motor at the first joint 1050 that causes an end effector 1042 of the mechanical arm 1040 to swing along an arc about the first joint 1050. The mechanical arm 1040 can be stowed at a side of the body 1020 when not in use such that the end effector 1042 is pointed toward the ground and rotated based on a task being performed by the robot 1000. The end effector 1042 is positioned at a desired height by causing the mechanical arm 1040 to rotate until reaching the desired height on the z-axis. As shown in FIG. 10A, the mechanical arm 1040 may have a first angle $\theta_1$ with respect to the z-axis. The mechanical arm 1040 may rotate in a clockwise or counterclockwise direction, such that the first angle $\theta_1$ has a range of motion up to 360 degrees. For motion in the x-y plane, the robot 1000 can cause the base 1030 to move and position the end effector 1042 at a desired location.

In one embodiment, the mechanical arm 1040 can move linearly. The linear motion can be alternatively or in addition to the rotational motion discussed above. The mechanical arm 1040 may be fixed at a predetermined angle such that the mechanical arm 1040 forms a first angle $\theta_1$ (e.g. 45 degrees) with the z-axis. The mechanical arm 1040 may be actuated up and down by moving the first joint 1050 up and down linearly along the z-axis to place the end effector 1042 at a desired height. The first joint 1050 may be fixed to a sliding rail on the body 1020, and the motor may move the sliding rail to position the mechanical arm 1040 at the desired height. The position of the end effector 1042 in the x-y plane is adjusted by causing the base 1030 to move. When the mechanical arm 1040 is not in use, the mechanical arm 1040 may be set to a predetermined height and instructed to be stowed away at a side of the robot 1000.

In one embodiment, the mechanical arm 1040 can move forwards/backwards by extending and retracting a portion of the mechanical arm. The mechanical arm 1040 may be divided into a plurality of segments, and at least one of the segments may be configured to extend and retract to change a length of the mechanical arm 1040. By extending and retracting, the robot 1000 may move the end effector 1042 closer to or farther from a desired location without moving the base 1030 along the y-axis. Causing the mechanical arm 1040 to extend and retract may allow the robot 1000 to move with more precision compared to adjusting the base 1030.

In one embodiment, the mechanical arm 1040 can move side to side along the x-axis. As shown in FIGS. 10B and 10C, the mechanical arm 1040 may have a second joint 1060 configured to pivot from side to side. The mechanical arm 1040 may move toward a center of the robot 1000 at a second angle $\theta_2$ relative to a vector perpendicular to a front surface of the robot 1000 or move in an opposite direction to move the end effector 1042 farther from the center of the robot 1000. Although not illustrated in FIGS. 10A-10C, in another embodiment, the mechanical arm 1040 may be placed on a rotatable ring (e.g., rotatable ring 920), and the rotatable ring may rotate in a clockwise or counterclockwise direction to move the mechanical arm 1040 to a desired location in the x-y plane. When the robot 1000 includes the rotatable ring, the mechanical arm 1040 may not include the second joint 1060, and the mechanical arm 1040 may be coupled to the rotatable ring at the first joint 1060.

Figure 11:
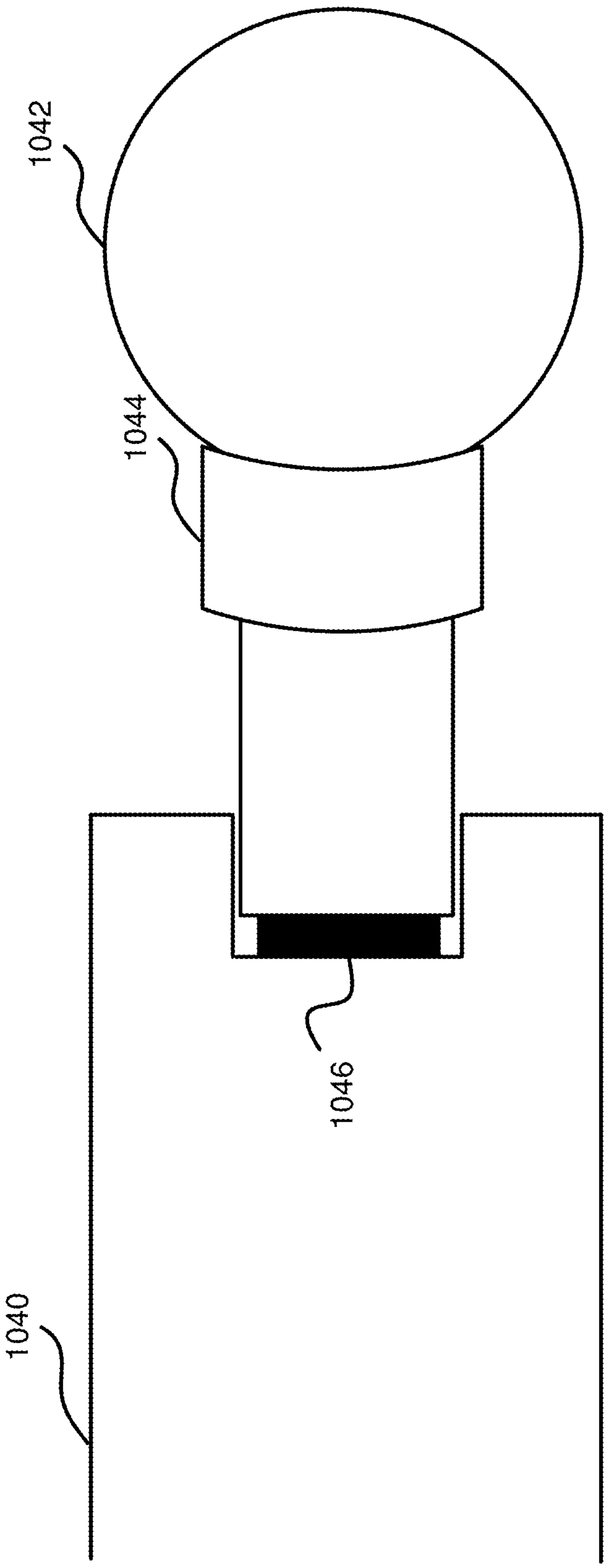
FIG. 11 illustrates an end effector of a mechanical arm, according to one embodiment.

FIG. 11 illustrates an end effector of a mechanical arm, according to one embodiment. The mechanical arm 1040 includes an end effector 1042 that lies within an end effector holder 1044. The end effector holder 1044 is in contact with a force sensor 1046 configured to sense a magnitude of force applied by the end effector 1042. As force is applied by the end effector 1042, the end effector holder 1044 compresses into the force sensor 1046. The force sensor 1046 can measure a magnitude of the force with which the end effector holder 1044 compresses into the force sensor 1046, and thus can measure a magnitude of force applied by the end effector 1042 onto an object or surface. This measure of magnitude of force can be used by the robot 100 to determine how much force is being applied by the mechanical arm 1040 and end effector 1042 onto an object or surface. The force sensor 1046 may be a force sensing resistor whose resistance changes proportional to a magnitude of force applied. It should be noted that in other embodiments, the mechanical arm 1040 can include additional, fewer, or different components than those illustrated here.

In an embodiment, the robot 1000 may take an elevator to move from a current floor of a building to a target floor. The end effector 1042 can be used for interacting with a button outside the elevator for calling the elevator to the current floor or a button within a control panel of the elevator corresponding to the target floor. The button may be displayed on a touch screen interface or may be a mechanical button. For interacting with a touch screen interface, the end effector 1042 may be capacitive.

In an embodiment, the mechanical arm 1040 may be positioned such that the end effector 1042 lies within field of view of one or more cameras of the robot 1000. The motion of mechanical arm 1040 may be calibrated with the one or more cameras of the robot 1000, and the one or more cameras may continuously capture images of the environment while operating the mechanical arm 1040 to visually track the position of the end effector 1042. Based on the images of the environment, the robot 1000 may identify a location of the end effector 1042 and compare it to a location of a target location to generate a motion plan for the mechanical arm 1040. For example, the mechanical arm 1040 may be used to press a button. The robot 1000 may use image processing to identify the button and a corresponding set of pixel coordinates for the button and identify the end effector 1042 and a corresponding pixel coordinates for the end effector 1042. Based on the pixel coordinates for the button and the pixel coordinates for the end effector 1042, the robot 1000 generates a motion plan for the mechanical arm 1040 such that the mechanical arm 1040 may move to a location corresponding to pixel coordinates for the button and push the button.

The robot 1000 may use a proportional-integral-derivative (PID) controller to adjust the position of end effector 1042 until the end effector 1042 is aligned with the button. As the end effector 1042 moves toward the button, the robot 1000 captures images of the environment including the button and the end effector 1042 and continuously determines an error between a position of the end effector 1042 and the button. The robot 1000 updates the motion plan based in part on the error until it is aligned with the button and interacts with the target button. The robot 1000 may collect three dimensional data to track the motion of the end effector 1042 or use two dimensional data to align the end effector 1042 with the target button and then approach the target button until the button is pressed. The robot 1000 may extend the mechanical arm 1040 to press the button or move toward the target button using the base 1030.

The end effector 1042 can be made of an elastomer, for instance, rubber, with a threshold tractive force between the end effector 1042 and a target surface. The tractive force allows the end effector 1042 to make contact with the target surface and apply a force without slipping. The end effector 1042 may be pointed at an angle that is not perpendicular to the target surface (e.g., angled upward or downward), but the tractive force of the end effector 1042 prevents the end effector 1042 from slipping off the target surface. As shown in FIG. 11, the end effector 1042 may be a spherical shape with a rounded tip. In other embodiments, the end effector 1042 may have a different shape such as a cylindrical or conical shape with a sharper end point in comparison to the spherical shape for increased precision.

In an embodiment, the robot 1000 may interact with a recessed button. When the robot 1000 determines that a target button is a recessed button, the robot 1000 may apply a force using the mechanical arm 1040 such that at least a portion of the end effector 1042 extends within the recess and pushes into the recessed button. Because the end effector 1042 is made of a flexible and elastic material, the tip of the end effector 1042 may expand as more force is applied. Since the tip of the end effector 1042 expands, the robot 1000 can be less precise when positioning the end effector 1042. For example, when aligning the end effector 1042 with the target button, the robot 1000 may adjust the position of the end effector 1042 until a center of the end effector 1042 is within a threshold distance of a center of the target button (e.g., within 1 cm of the center of the target button. Because a surface area of the tip of the end effector 1042 increases with force, the robot 1000 may apply force until the end effector 1042 expands and presses the target button. If the robot 1000 is unable to press the button after applying a maximum force, the robot 1000 may adjust a position of the end effector 1042 to be closer to the desired position and then reapply force until pressing the target button. The robot 1000 may also attempt pressing around the original location by shifting slightly above, slightly below, slightly left, and slightly right in case the calibration of the visual system is slightly incorrect.

Robot-Elevator Interactions

Figure 12A:
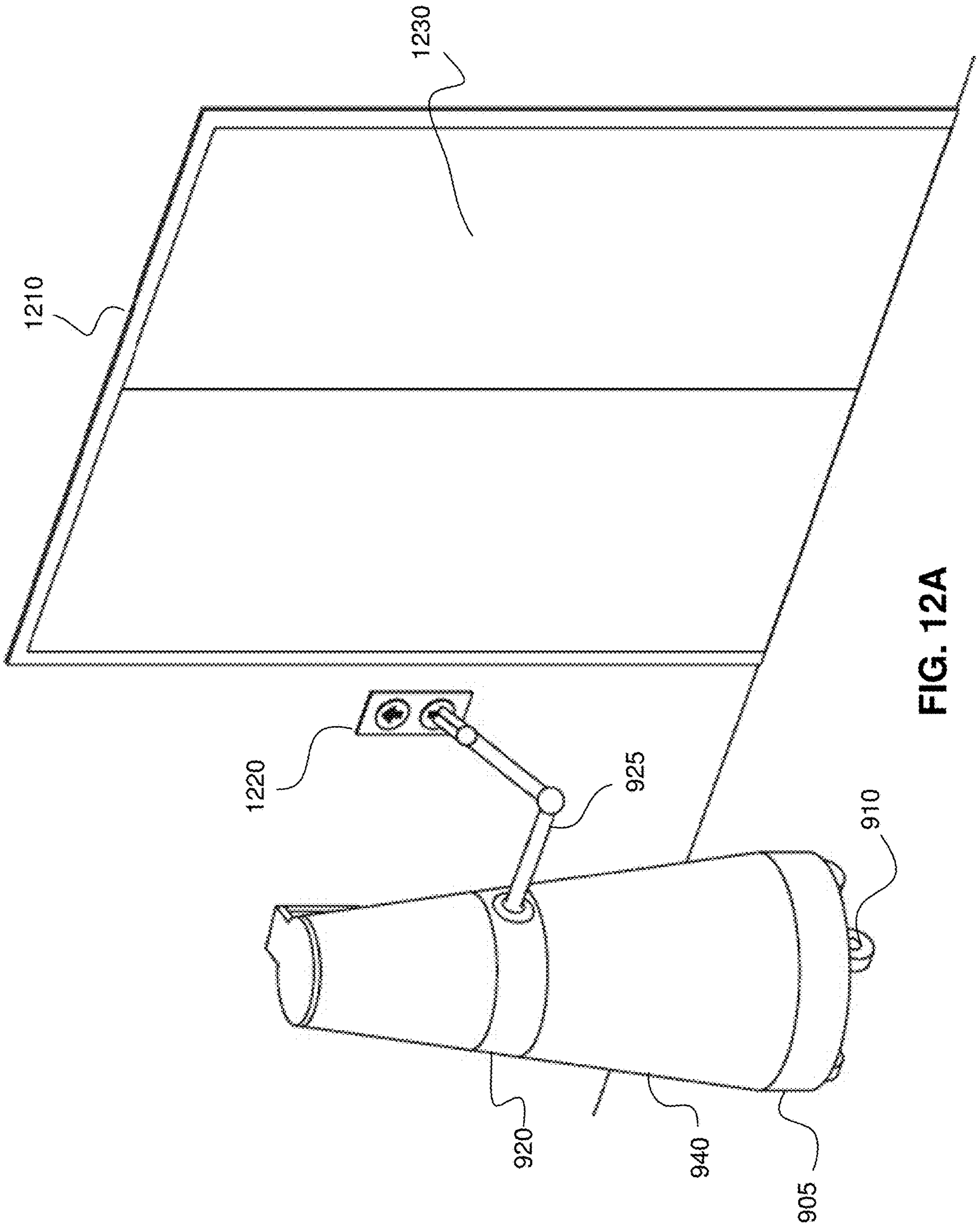
FIGS. 12A, 12B, and 12C illustrates a process of a mobile robot using an elevator, according to one embodiment.
Figure 12B:
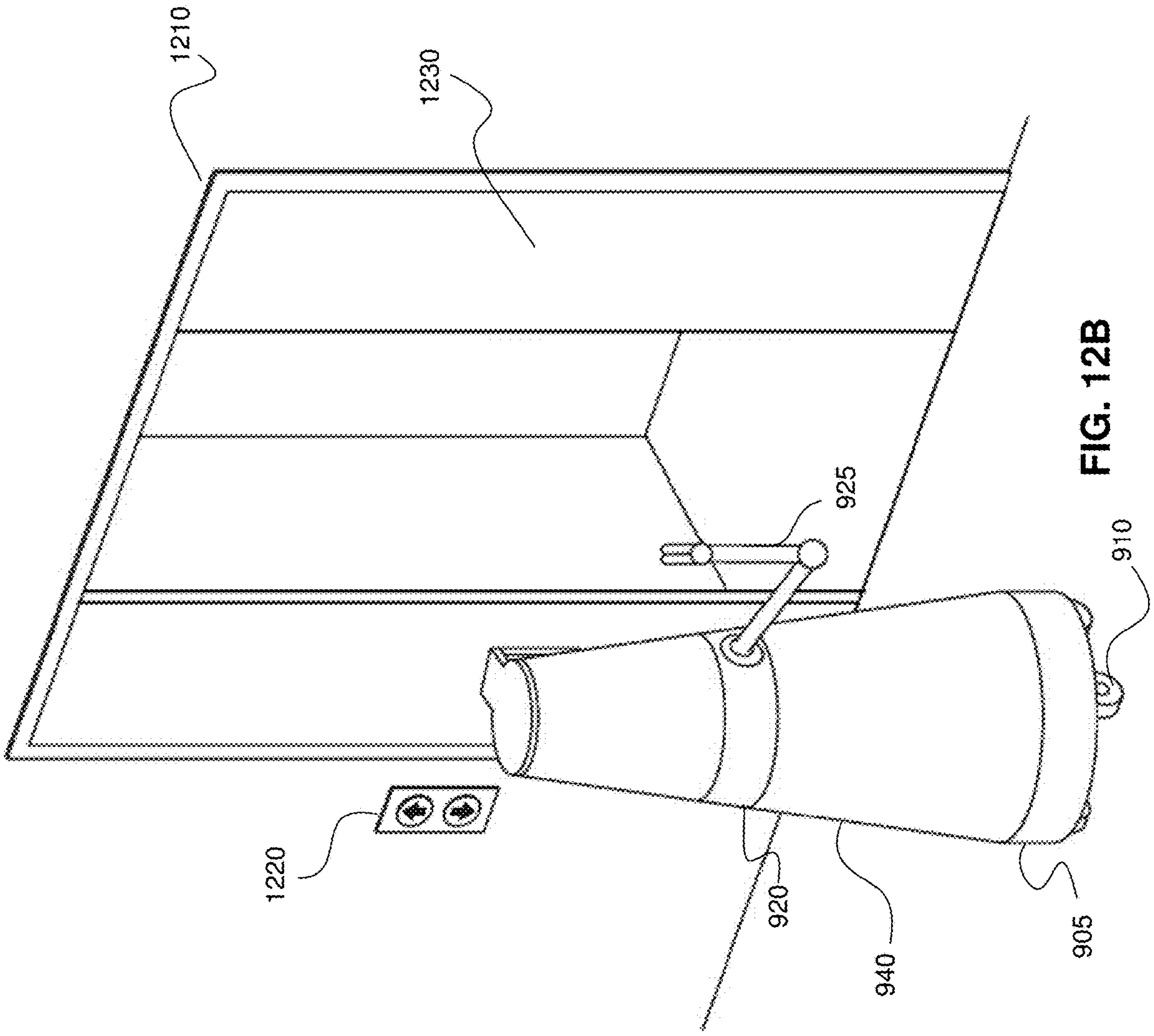
Figure 12C:
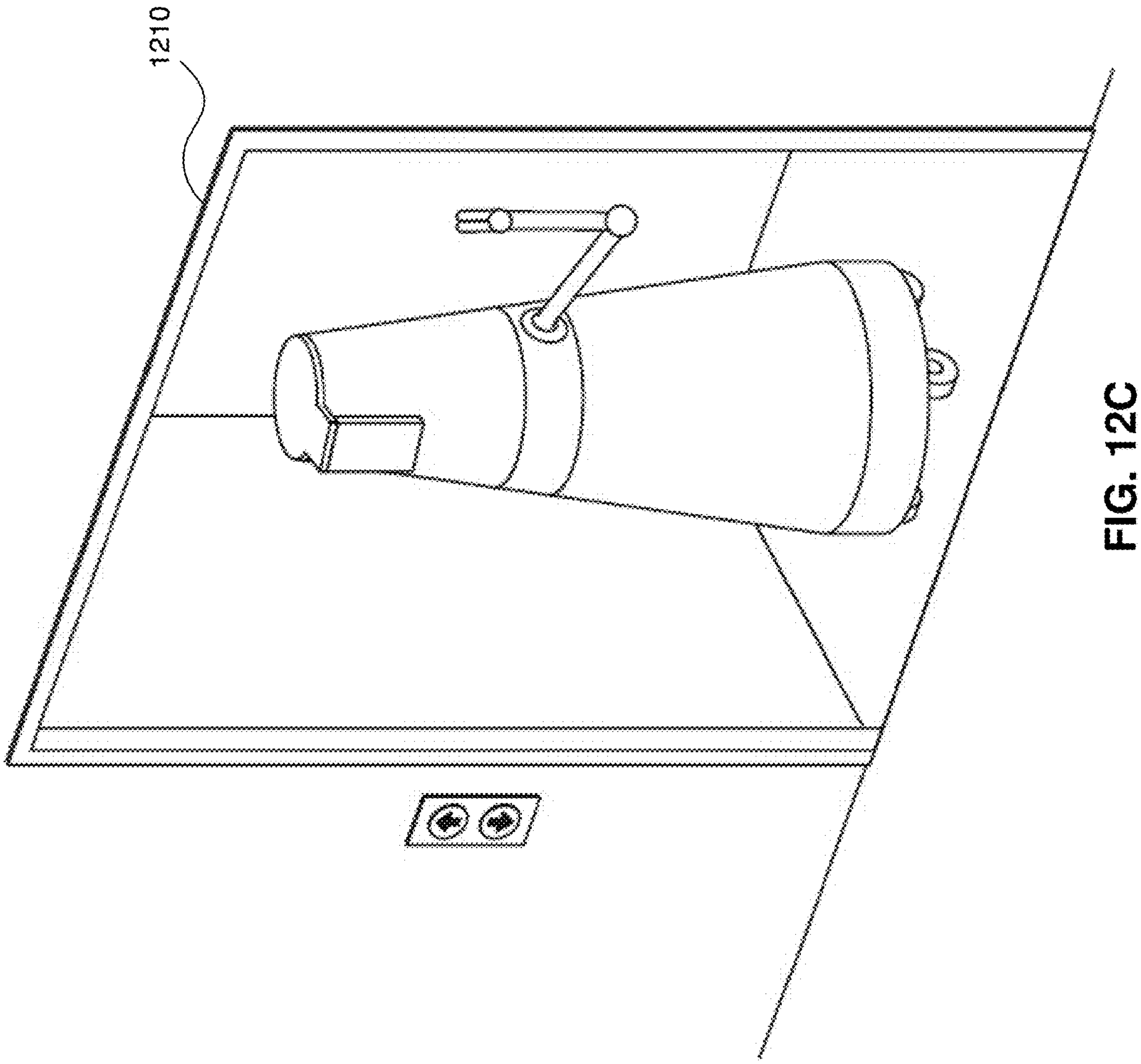

FIGS. 12A, 12B, and 12C illustrate a process of a mobile robot 900 using an elevator 1210, according to one embodiment. FIGS. 12A through 12C illustrate example motions and operations that the robot 900 may perform to use the elevator 1210. The robot 900 may perform fewer, additional, or different steps to use an elevator than those illustrated in FIGS. 12A-C according to the principles described herein.

The robot 900 may receive navigation instructions to go to a target floor that is different from a current floor of the robot 900, for instance from a remote security officer or as part of a security routine being implemented or performed by the robot. The robot 900 may be directed to move to a particular location on the target floor, to patrol the target floor, respond to an emergency on the target floor, and the like. The robot 900 identifies a location of an elevator, for instance using a floor map of a building, and moves via the motorized base 905 based on the navigation instructions to a location within a threshold distance from the elevator. The threshold distance may be based in part on a reach of the mechanical arm 925.

As shown in FIG. 12A, after moving to the location within the threshold distance from the elevator 1210, the robot 900 presses a button 1220 outside of the elevator 1210 to call the elevator 1210. There can be a plurality of buttons 1220 outside of the elevator 1210 that represent the directions that the elevator can move (e.g., up, down) and the robot 900 determines which of the plurality of buttons 1220 to press based on the location of the target floor relative to the current floor. For instance, the robot 900 can compare a value associated with the current floor of the robot 900 to a value associated with the target floor and select the button 1220 based on the comparison. In one example, the robot is currently on the fifth floor, which is associated with a value of 5, and a target floor is a first floor of an underground parking garage, which is associated with a value of −1. Since the target floor is associated with a value less than a value of the current floor, the robot 900 can select the button 1220 associated with the downward direction. In another example, the robot is currently on the first floor of the underground parking garage and the target floor is the fifth floor. Since the target floor is associated with a value greater than a value of the current floor, the robot 900 can select the button 1220 associated with the upward direction.

In some embodiments, the elevator 1210 is associated with an access control system outside of the elevator 1210 that requires access credentials (such as a key fob, an identity card, or an RFID-enabled object) before being able to press the button 1220 for calling the elevator 1210. The robot 900 may identify a location of the access control system and moves to a threshold distance from the access control system. The robot 900 can then present access credentials for access to the elevator 1210. To present the access credentials, the robot 900 may rotate the rotatable ring 920 to a particular position with respect to the robot body 940 to put the mechanical arm 925 in position for presenting the access credentials. In one embodiment, the robot 900 may be remotely connected to the access control system via the network 200 and present the access credentials wirelessly and/or without physical interaction with the access control system.

Once the robot 900 determines the button 1220 or buttons 1220 to press, the robot 900 generates a motion plan for the rotatable ring 920 and the mechanical arm 925. The robot 900 can use the camera system with one or more cameras on the robot 900 to receive image data for determining a position of the selected button 1220. Based on the determined position, the robot 900 determines a current position of the mechanical arm 925 with respect to the robot body 940 and determines a target position relative to the robot body 940 to put the mechanical arm 925 in position to press the selected button 1220. In one embodiment, the robot 900 has a depth camera on the mechanical arm 925 used to determine how far the mechanical arm 925 is from the selected button 1220 as the mechanical arm 925 moves towards the selected button 1220, which allows for precise and accurate movement of the arm.

After pressing the button 1220, the robot 900 moves to a location in front of the elevator doors 1230. In some embodiments, the robot 900 may align the wheels 910 to be perpendicular to the elevator doors 1230. Aligning the wheels 910 to be perpendicular can reduce the probability of the wheels 910 accidentally getting caught in a space between building floors and elevator cabins. The robot 900 may iteratively move backwards and forwards until the wheels 910 are positioned appropriately for entering the elevator 1210, or may rotate in place until the wheels are aligned.

As shown in FIG. 12B, the robot 900 detects when the elevator doors 1230 open. The robot 900 may use one or more sensors and/or cameras to detect that the elevator doors 1230 are moving. For example, the robot 900 may have a motion detection sensor that detects the movement of the elevator doors 1230. The robot 900 may also receive image data of the surrounding environment and use image detection to determine that the elevator doors 1230 are open. Once the elevator doors 1230 are fully open, the robot 900 analyzes the inside of the elevator to determine whether there is enough space for the robot 900 to enter the elevator.

Prior to entering the elevator 1210, the robot 900 determines if the elevator 1210 is going in a direction associated with the selected button 1220. For example, if the robot 900 called an elevator 1210 going down, the robot 900 should not enter an elevator 1210 that is going up. The robot 900 may determine a direction associated with the elevator 1210 based on indicators such as an audio output from the elevator 1210, a light on the selected button 1220 turning off responsive to the elevator 1210 doors opening, a light indicator indicating an elevator direction above the elevator 1210, and so forth.

The robot 900 may receive image data of the inside of the elevator using cameras included in the robot 900 as well as cameras installed in the elevator or on the current floor with visibility into the elevator. In some embodiments, the robot 900 may communicate with the central system to receive image data of the elevator 1210 from one or more cameras that are installed within the elevator 1210 and the building. In some embodiments, one or more sensors in the elevator 1230 may keep track of the number of individuals that enter and leave the elevator 1210 and a total weight within the elevator 1230. The robot 900 determines a number of individuals in the elevator 1210 and compares the determined number to a maximum occupancy of the elevator 1210. If the determined number is equal to or exceeds the maximum occupancy, the robot 900 does not enter and instead waits for a next elevator 1210.

The robot 900 determines a target location in the elevator 1210. Based at least in part on the image data received from cameras on the robot 900 and/or cameras installed within the elevator 1210, the robot 900 identifies one or more open locations in the elevator 1210. The image data may specify locations of one or more individuals and objects that are already in the elevator 1210. The one or more open locations each correspond to a section of the elevator 1210, where each section has at least an area greater than the area of the motorized base 905 of the robot 900. The one or more open locations do not have any individuals or objects in the area associated with the open locations. If there are no open locations in the elevator 1210, the robot 900 waits for a next elevator 1210. Once determining that there are no open locations, the robot 900 can wait until the elevator doors 1230 are completely closed. When the elevator doors 1230 are completely closed, the robot 900 can cause the mechanical arm 925 to press the button 1220 outside of the elevator 1210 again to call another elevator 1210.

In some embodiments, there may be a plurality of open locations in the elevator 1210 that the robot 900 can select as the target location. The robot 900 can select one of the plurality of open locations based on future movement. The robot 900 may determine a distance between each of the plurality of open locations to a reference location such as a panel of buttons in the elevator 1210 or the elevator doors 1230. In one example, the robot 900 may select an open location that is closest to the elevator doors 1230 as the target location because it is easier for the robot 900 to move to the target location and exit from the target location. Alternatively, the robot 900 may select an open location that is closest to the panel buttons so that the robot can quickly select a floor button, and can subsequently move to a different open location within the elevator (for instance, to allow people within the elevator to have access to the panel buttons, or to position the robot to easily exit the elevator when the elevator arrives at the target floor). In other embodiments, the robot 900 may select an open location further away from other elevator passengers.

Once the target location is selected, the robot 900 generates a motion plan for the motorized base 905 to move the robot 900 to the target location. As discussed above, the robot 900 may align the wheels 910 to be perpendicular with the elevator doors 1230 such that the wheels 910 of the robot 900 do not get stuck in the space between the floor and the elevator cabin as the robot 900 enters. Further, the robot 900 may move into the elevator 1210 with at least a first threshold velocity to reduce the possibility of the wheels 910 getting stuck, but below a second threshold velocity to reduce the risk of the robot running into an elevator passenger. In some embodiments, the speed that the robot moves (both with regards to an elevator and in regards to other types of movement described herein) is lower when people are visible to or within a threshold distance of the robot than when the robot is moving without people nearby.

The robot 900 enters the elevator 1210 and moves to the target location. In one embodiment, once the robot 900 enters the elevator 1210 and moves to the target location, the robot 900 may rotate 180 degrees such that the robot body 940 faces the elevator doors 1230, as illustrated in FIG. 12C. By rotating 180 degrees after entering the elevator, the robot 900 is better able to exit the elevator without subsequent rotation or re-orientation. In another embodiment, the robot 900 does not rotate after entering the elevator 1210 and remains in the orientation in which the robot 900 entered. By not rotating in the elevator 1210, the robot 900 can maintain the perpendicular alignment of the wheels 910 and avoid accidentally making contact with individuals in the elevator 1210 or objects in the elevator 1210.

After entering the elevator 1210 and moving to the target location, the robot 900 presses a button inside the elevator 1210 associated with the target floor. The robot 900 may use an image recognition software to determine numbers, letters, and characters associated with the buttons that represent various floors of the building. The elevator 1210 may have a panel of buttons in the elevator 1210 including buttons associated with floors as well as buttons for opening and closing the elevator doors 1230, calling for help in a case of emergency, and sounding an alarm in a case of emergency. The robot 900 determines a location of the button associated with the target floor from the panel of buttons with respect to the mechanical arm 925. Based on the location, the robot 900 generates a motion plan for the mechanical arm 925 to press the button. The motion plan can include instructions for the rotatable ring 920 to move the mechanical arm 925 to a position relative to the robot body 940 that allows the mechanical arm 925 to reach and press the button. In some embodiments, the elevator 1210 may include an access control system inside the elevator 1210 that requires access credentials before pressing the button associated with the target floor. The robot 900 may move to a location within a threshold distance from the access control system in the elevator 1210 and present the access credentials to the access control system. The robot 900 may rotate the rotatable ring 920 and move the mechanical arm 925 to present the access credentials. Once access is granted, the robot 900 implements the motion plan by rotating the rotatable ring 920 to a position identified by the motion plan and by extending the mechanical arm 925 as identified by the motion plan to press the button associated with the target floor. In some embodiments, the motion plan further identifies a movement for the motorized base 905 to press the button, and then causes the robot 900 either to stay in a current location or to return to a target location within the elevator 1210.

In one embodiment, if there is at least one individual in the elevator 1210, the robot 900 requests that the individual press the button associated with the target floor instead of moving the mechanical arm 925 to press the button. The robot 900 may generate an audio output specifying the target floor (e.g., "please press the button for the 3rd floor"). In another embodiment, the robot 900 may compare a distance between the robot 900 and the button to a distance between the individual and the button and request that the other individual press the button if the distance between the robot 900 and the button is greater than the distance between the individual and the button. In some embodiments, the robot 900 may communicate with the central system that sends instructions to the elevator 1210 to stop at the target floor without manual interaction with the button.

As the elevator 1210 moves up or down floors, people may enter and leave the elevator 1210. The robot 900 may update the target location within the elevator 1210 based on movement of the people entering and leaving the elevator 1210. For example, if a current location of the robot 900 within the elevator 1210 is near the elevator door 1230, and a person that is standing in a location near the back of the elevator 1210 exit the elevator, the robot 900 may update the target location to the location near the back of the elevator 1210. This allows future passengers of the elevator 1210 to enter the elevator 1210 more easily. In some embodiments, the robot 900 can leave the elevator altogether to let someone off the elevator, and can re-enter the elevator after the person has left.

While the robot 900 is in the elevator 1210, the robot 900 may lose connection to the central system (or may lose wifi or wireless coverage), which prevents the robot 900 from receiving navigation instructions and updated information associated with the surrounding environment. In one example, when the robot 900 loses connection to the central system, the robot 900 may generate an updated motion plan to exit the elevator 1210 at a next instance of the elevator doors 1230 opening. In another example, the robot 900 can also select a default floor (e.g., lobby) after losing connection. In addition, the robot 900 may travel to the target floor, may leave the elevator after arriving at the target floor, and may attempt to re-establish a communicative connection once off the elevator.

The robot 900 may receive image data inside the elevator 1210 and determine a floor at which the robot 900 is exiting. For example, the robot 900 may receive an image of a display (e.g., segment display, LCD, LED, and the like) within the elevator 1210 that shows a current floor of the elevator 1210. The robot 900 may also use wireless fingerprinting (e.g., RFID tags, communication with specific access control systems, or WiFi fingerprinting) to determine which floor the elevator car is stopped at. In another embodiment, the robot 900 may exit the elevator 1210 without determining a current floor. After exiting the elevator 1210, the robot 900 collects information about the current floor using one or more sensors and cameras on the robot 900. The robot 900 may access one or more semantic maps that include information about floors of a building that is accessible by the elevator 1210 and compare the collected information to the information in the one or more semantic maps. For each of the floors of the building, the robot 900 may determine a score that indicates a similarity between the collected information and the information stored in the one or more semantic maps. Based on the determined scores, the robot 900 may select a floor that has a highest score as the current floor. The robot 900 may also collect real-time data while riding the elevator 1210 using sensors such as an altimeter or an accelerometer in order to determine a current floor of the elevator.

The robot 900 may detect unusual movement while in the elevator 1210. For example, the robot 900 may detect sudden up and down movement or an extended period of no movement and determine that the elevator 1210 is not operating regularly. During an emergency while in the elevator 1210, the robot 900 may generate a motion plan to select one or more buttons associated with emergencies. For example, the robot 900 may identify a location of an alarm button or a call button and cause the rotatable ring 920 to place the mechanical arm 925 in position to press the alarm button or the call button. The robot 900 may generate an audio output that describes the emergency after being connected to safety personnel and request for help. The robot 900 may also attempt to communicate with the central system to notify the central system about the emergency.

When the robot 900 arrives at the target floor, the robot 900 may identify the opening of the elevator doors 1230. In a similar manner to entering the elevator 1210, the robot 900 may move backwards and forwards within the elevator 1210 to align the wheels 910 to be perpendicular to the elevator doors 1230, and may exit the elevators 1210 at a speed sufficient to reduce the risk of getting stuck within the elevator threshold. In some embodiments, the robot 900 waits for other elevator passengers to exit before leaving the elevator.

FIGS. 13A, 13B, 13C, and 13D illustrates a process of a mobile robot using an elevator, according to one embodiment. FIGS. 13A through 13D illustrate example motions and operations that the robot 900 may perform to use the elevator system 1300. In an embodiment, the robot 900 may be the robot 1000. The robot 900 may perform fewer, additional, or different steps to use the elevator 1300 than those illustrated in FIGS. 13A-13D according to principles described herein. Description for elements discussed above with respect to FIGS. 12A-12C is omitted to avoid redundancy.

The robot 900 may receive navigation instructions to go to a target floor that is different from a current floor of the robot 900. The robot identifies a location within the current floor of an elevator system 1300 including a plurality of elevators 1310. The robot 900 may identify the location of the elevator system 1300 based on a floor map of a building and move to the location using the motorized base 905.

Figure 13A:
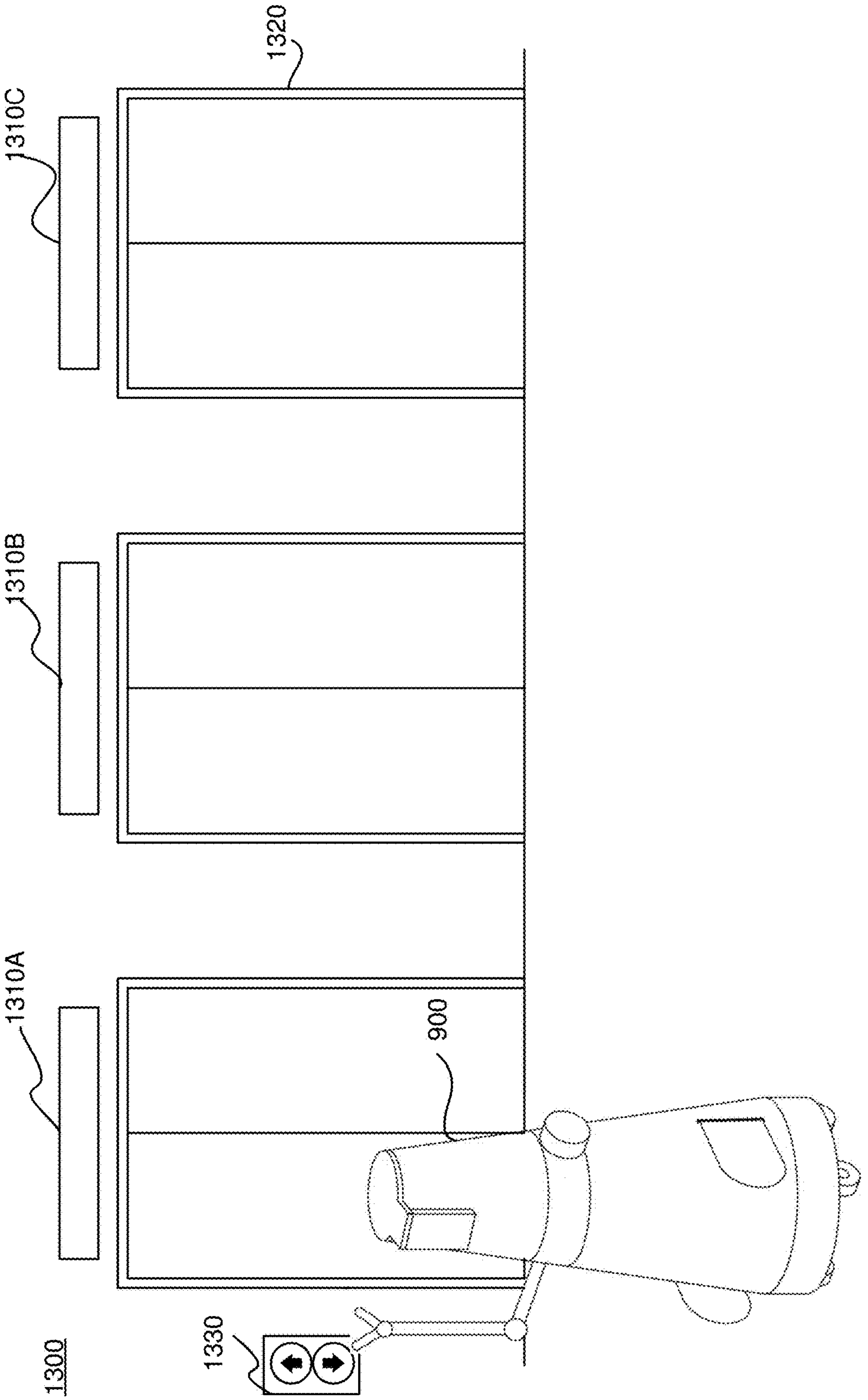
FIGS. 13A, 13B, 13C, and 13D illustrates a process of a mobile robot using an elevator, according to one embodiment.

As shown in FIG. 13A, the robot 900 presses a button 1330 using the mechanical arm 925 to call an elevator 1310 of the plurality of elevators 1310 to the current floor after arriving at the location of the elevator system 1300. The robot 900 moves to a location within a threshold distance from the buttons 1330 of the elevator system control to call the elevator 1310. The robot 900 may capture an image including the buttons 1330 and determines which of the buttons 1330 to select based on the image. The robot 900 may perform an image recognition operation on the captured image to identify characters or symbols printed on or near the buttons 1330. For example, the buttons 1330 may include an "up" button represented by an arrow pointed upward and a "down" button represented by an arrow pointed downward. Based on the image recognition, the robot 900 may determine which button 1330 to push. In some embodiments, the robot 900 may interact with the elevator system 1300 by presenting access credentials, communicating wirelessly with the elevator system 1300, and the like to call the elevator 1310 instead of pressing the button 1330.

In some embodiments, the robot 900 may determine how to press a target button 1330 of the elevator system control panel based on a pre-determined map of the elevator system control panel. The pre-determined map may include location information such as coordinates of each of the buttons 1330 (e.g., the "up" button is at a location 2 inches left and 3 inches down of a top left corner of the elevator system control panel). If the robot 900 is unsuccessful in pressing the target button using the pre-determined map, the robot 900 may use images captured by cameras on the robot 900 and perform image recognition to identify the buttons 1330 then try to press the target button 1330. If both methods fail, the robot 900 may retrieve a 3-dimensional coordinate location of the elevator system control panel and use dead reckoning to press the target button 1330.

Figure 13B:
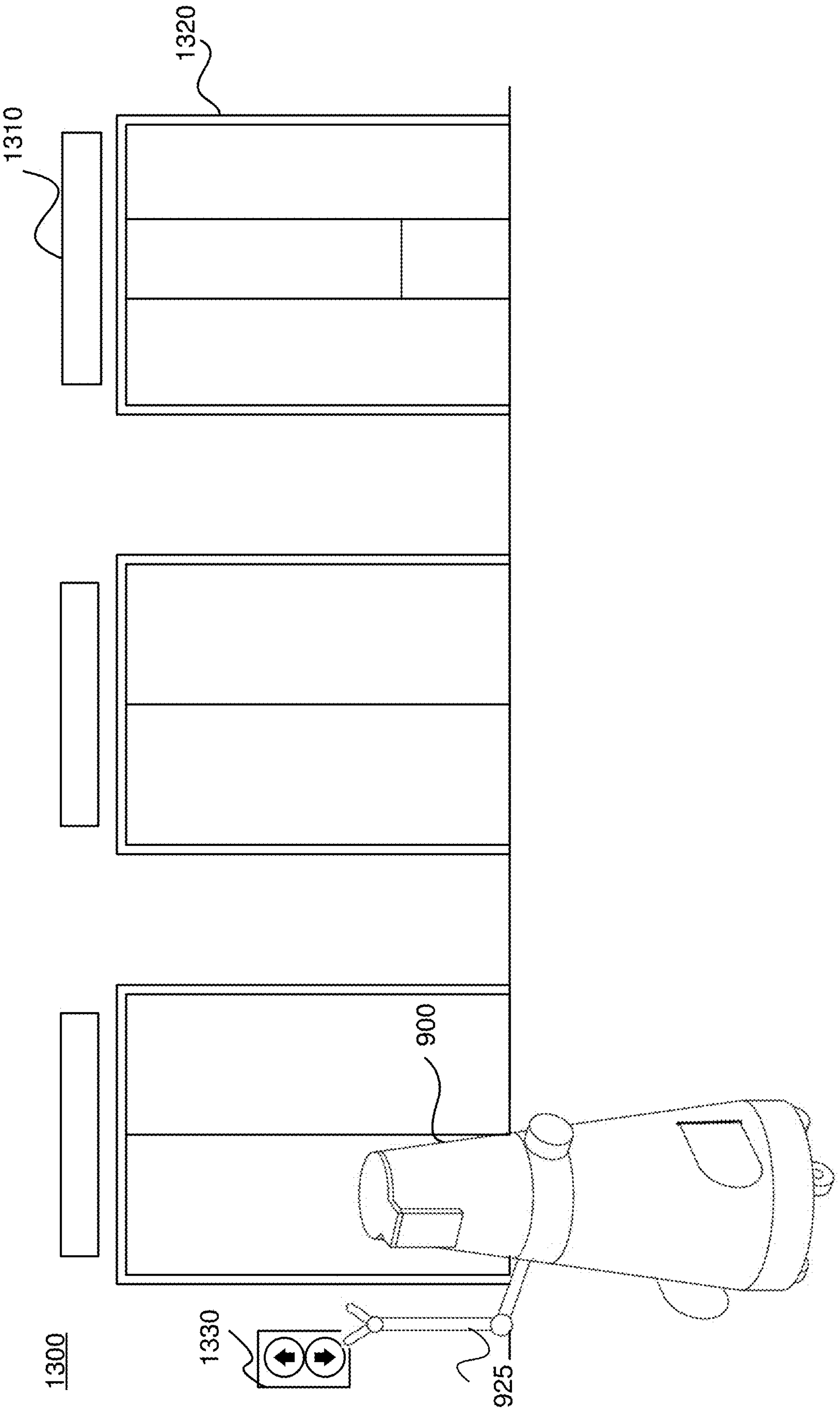

As shown in FIG. 13B, the robot 900 determines when an elevator 1310 arrives at the current floor. When an elevator 1310 arrives at the current floor, the elevator system 1300 may use a visual indicator such as a light to indicate which elevator 1310 has arrived. In the example shown in FIG. 13B, a light located near the elevator 1310 on the right may be turned on when the elevator 1310 arrives. The robot 900 may use computer vision to determine which elevator 1310 has arrived based on images of the visual indicator captured by the robot, based on images of the elevator doors as they open captured by the robot, based on images of people as they move towards an elevator, and the like. The robot 900 may also use audio processing to determine which elevator 1310 has arrived.

The robot 900 may determine that an elevator 1310 has arrived at the current floor responsive to identifying that doors of the elevator 1310 are opening. In some embodiments, the robot 900 uses a laser depth sensor to identify when and which elevator 1310 doors are opening. In such embodiments, while the robot 900 is waiting for an elevator 1310 to arrive, the robot 900 may continuously scan the elevator doors 1320 for each of the elevators 1310 to detect the set of doors that opens.

In an embodiment, the robot 900 determines that an elevator 1310 has arrived at the current floor based on activity of people or other robots 900. For example, when the robot 900 identifies a person exiting the elevator 1310 or identifies a person moving toward or into the elevator 1310, the robot 900 assumes that the elevator 1310 has arrived and the doors 1320 are open. Responsive to determining that the elevator 1310 has arrived and the doors 1320 are open, the robot 900 may begin moving towards the elevator 1310.

In an embodiment, the robot 900 uses a semantic map to determine which elevator doors 1320 are opening. Each of the elevators 1310 may be equipped with a motion sensor that detects when the elevator doors 1320 are opening and closing. The motion sensor may be connected to the semantic map, and the semantic map may be updated in substantially real time to indicate a state of the doors 1320. For example, the possible door states may be opening, fully open, or closing. The robot 900 may store the semantic map locally, and the semantic map may be updated remotely by a central system associated with the building in which the elevators are located. Alternatively, the central system may store and update the semantic map, and the robot 900 may query the semantic map remotely.

Figure 13C:
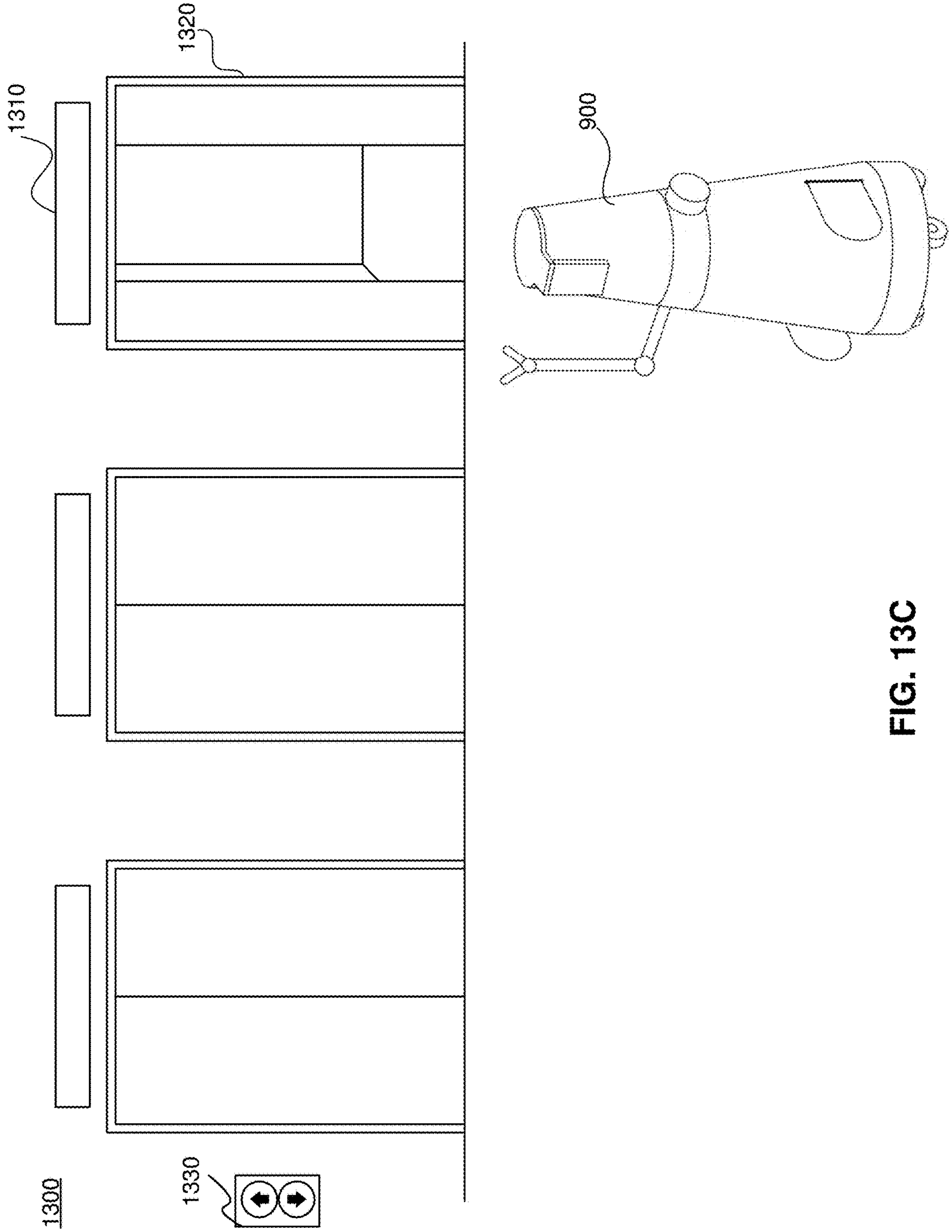

As shown in FIGS. 13B and 13C, after identifying which elevator 1310 has arrived at the current floor and the elevator doors 1320 are opening, the robot 900 generates a motion plan to enter the elevator 1310. To allow sufficient time for the robot 900 to enter the elevator 1310, the robot may interact with the elevator system to cause the elevator 1310 to remain at the floor for a longer duration compared to a typical stop on a floor for the elevator. In an embodiment, the robot 900 presses the button 1330 again after the doors 1320 begin to close but before the doors 1320 close completely. The interaction may cause the doors 1320 to reopen, which increases an amount of time the robot 900 has to move toward and enter the elevator 1310. Immediately after making the interaction, the robot 900 may begin moving toward the elevator 1310.

When the robot 900 requests an elevator 1310 by pressing the button 1330, the robot 900 may appear (from the perspective of the elevator) indistinguishable from a human requesting the elevator 1310. However, when the robot 900 uses other methods such as using access credentials or wireless communication to request the elevator 1310, the robot 900 may communicate to the elevator system that it is a robot, and may request that the elevator 1310 remain on the current floor. The elevator system 1300 may be pre-programmed to open the elevator doors 1320 for a longer-than-normal duration responsive to receiving a request from a robot. For example, when the robot 900 requests an elevator 1310, the elevator system 1300 may leave the door open for a minute compared to leaving the door open for 30 seconds when the elevator 1310 is requested by a human. Alternatively, the elevator system 1300 may leave elevator doors 1320 open until the robot 900 has safely entered the elevator 1310 before causing the elevator doors 1320 to close. To determine whether the robot 900 has safely entered the elevator 1310, the elevator system 1300 may wait until receiving a signal from the robot 900 or use one or more cameras or other sensors installed within the elevator 1310 to determine whether the robot 900 is inside the elevator 1310.

In an embodiment, the robot 900 may receive motion instructions from a human operator that is operating the robot 900 via teleoperation. After receiving instructs to move from the current floor to the target location, the robot 900 may disable teleoperation and transition into an autonomous mode of operation. When taking an elevator 1310, the robot 900 may need to move quickly into the elevator 1310. Human operator response may be delayed and may prevent the robot from entering the elevator 1310 before the doors 1320 close, so teleoperation may be disabled to prevent damage to the robot 900 while the robot 900 boards the elevator 1310.

If the robot 900 is unable to enter the elevator 1310 before the elevator doors 1320 begins to close or if the elevator 1310 is full by the time the robot approaches the elevator, the robot 900 waits for the elevator to leave and calls another elevator. If there is sufficient space for the robot 900 to insert the mechanical arm 925, the robot 900 may attempt to hold the elevator 1310 by swiping the mechanical arm 925 between the elevator doors 1320, triggering the motion sensor of the elevator doors, and causing the elevator doors 1320 to reopen. Responsive to the elevator doors 1320 reopening, the robot 900 continues to enter the elevator 1320.

Figure 13D:
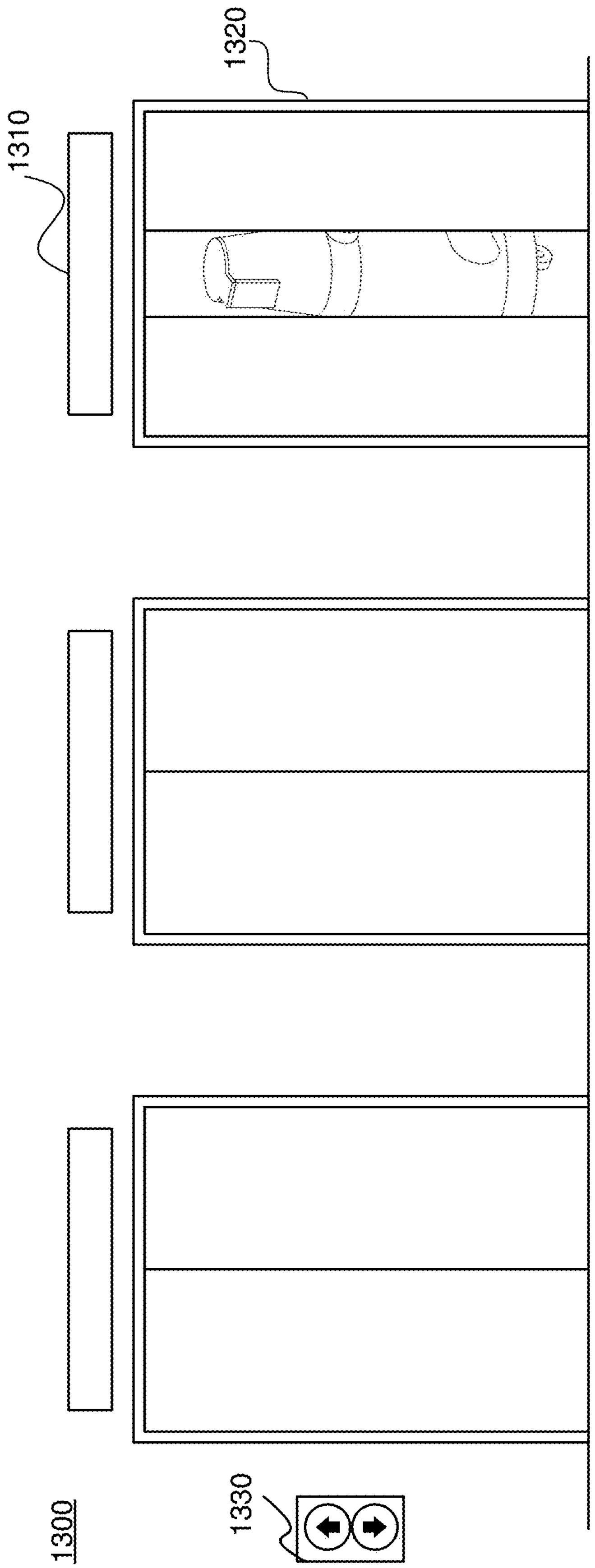

After identifying that the elevator 1310 that arrived, the robot 900 may move to a pre-determined target location within the elevator 1310. The pre-determined target location may be marked using fiducial tags such as Apriltags, QR codes, and the like. The fiducial tags may not be visible to the human eye, but may be read by the robot 900 using methods such as IR sensing. The pre-determined target location may be close to a control panel inside the elevator 1310 such that the control panel is within reach of the mechanical arm 925. In one example, the pre-determined target location may be stored in a semantic map of the building in association with the elevator 1310. After identifying which elevator 1310 has arrived, the robot 900 may generate a motion plan to cause the robot 900 to move to the pre-determined target location. In some embodiments, the robot 900 may enter the elevator 1310 and then identify the control panel based on images captured by the robot 900. Responsive to identifying the control panel, the robot 900 may move to a location with a threshold distance to the control panel such that the robot 900 may press a button corresponding to the target floor. As shown in FIG. 13D, when the robot 900 is completely inside the elevator 1310, the doors 1320 close.

After entering the elevator 1310, the robot 900 may request to move to the target floor by pressing a button associated with a target floor on the control panel. Responsive to pressing the button, the robot 900 may detect whether the elevator 1310 is moving using sensors in the robot such as an accelerometer and IMU or based on semantic map. When the robot determines that the elevator 1310 is not moving, the robot 900 may attempt to press around the button using the mechanical arm 925. The calibration of the motion of the mechanical arm 925 may have an error, and the robot 900 may repeat pressing the button slightly above, below, left, and right of the original attempt until the button is pressed.

The robot 900 may also require additional time for exiting the elevator 1320. In an embodiment, the robot 900 may request that the elevator 1310 stop at an additional floor prior to stopping at the target floor to allow additional time for the robot 900 to position itself for exiting the elevator 1310 while the elevator 1310 stops at the additional floor. For example, if the target floor is the fifth floor, the robot may also press a button associated with the fourth floor such that the robot 900 may reposition itself during the additional stop at the fourth floor. The robot 900 may use other methods for additional time such as asking a passenger in the elevator 1310 to hold the "open" button to hold the door 1320, communicating with the elevator system 1300 to hold the door open until the robot 900 communicates that it has exited the elevator, swiping its arm between the door to cause it to reopen, and the like.

In some embodiments, the robot 900 may be unable to exit the elevator 1310 as the elevator doors 1320 are opening on the target floor. For example, if the robot 900 is blocked by a passenger or an object that prevents the robot 900 from exiting the elevator 1310 safely, the robot 900 may wait until an exit path of the robot 900 is clear. After the exit path is cleared, if the robot 900 is unable to exit the elevator 1320 before the elevator doors 1320 shut, the robot 900 may press a button associated with a different floor and press a button associated with the target floor again to cause the elevator 1310 to move to the different floor and return to the target floor. The robot 900 may position itself for exiting as the elevator 1310 moves to the different floor and back to the target floor.

In some embodiments, the robot 900 may estimate which floor the elevator 1310 is on as the elevator 1310 moves. The robot 900 may use a combination of sensors such as an accelerometer and an IMU to determine movement of the elevator 1310 and the semantic map of the environment that includes information such as distance between each floor or a height of each of the floors to determine which floor the robot 900 is on. The robot 900 may determine that an estimated floor is incorrect if the estimated floor is between floors when the elevator doors 1320 are opening (e.g., at floor 9.5 instead of floor 9 or floor 10). The robot 900 may also determine that the estimated floor is incorrect if the estimate is greater than a maximum number of floors in a building. When the robot 900 determines that its estimate is incorrect, the robot 900 may exit the elevator 1310 as soon as possible (e.g., the next time the elevator 1310 stops at a floor). The robot 900 may also exit the elevator 1310 when it recognizes that there are issues with interactions with the elevator system 1310. For example, the robot 900 may determine that there is an error when the elevator 1310 stops at a floor different from a target floor indicated by the robot 900. If the robot 900 presses a button to go to the fourth floor, but the elevator 1310 stops at the fifth floor, the robot 900 determines that there is an error. After exiting the elevator 1310, the robot 900 may initiate contact with a remote operator or a support engineer for troubleshooting the issue.

In an embodiment, the robot 900 may recalibrate the estimate system after exiting the elevator 1310 on a floor based on information visible to or detectable by the robot once on the floor. The robot 900 may identifying which floor it exited on based on a network connection or an indicator such as a sign. The robot 900 may update its system and return to the elevator 1310 and attempt to go to the target floor again.

FIG. 14 is a flow chart illustrating a process of a mobile robot interacting with an elevator, according to one embodiment. In other embodiments, the mobile robot may perform fewer, additional, or different movements or operations than illustrated in FIG. 14 according to the principles described herein.

A controller of the mobile robot interacts 1410 with an elevator system associated with a plurality of elevators to call an elevator to a current floor on which the mobile robot is located. To interact with the elevator system, the mobile robot may press a button, present access credentials, communicate wirelessly, or otherwise communicate with the elevator system to request the elevator to the current floor.

The controller identifies 1420 doors of a first elevator of the plurality of elevators opening when the first elevator arrives at the current floor. The controller may determine that the first elevator has arrived by identifying when the doors of the first elevator opens. In an embodiment, the controller may use a laser beam, computer vision, semantic map, or the like to identify the doors opening.

Responsive to identifying the doors of the first elevator opening, the controller of the mobile robot interacts 1430 with the elevator system to cause the first elevator to remain at the current floor. The mobile robot may require additional time than a duration of a typical stop, and the mobile robot may interact with the elevator system to cause the doors of the first elevator to remain open for a longer duration. In an embodiment, the controller causes a mechanical arm of the mobile robot to press the button again after the elevator doors begin to close but before the elevator doors close completely to cause the elevator doors to reopen in order to maximize the amount of time the robot has to move to the elevator before the elevator doors close again. In other embodiments, the elevator system may be pre-programmed to remain at the current floor and leave the doors open for a longer period when a mobile robot (not a human) requests an elevator.

After interacting with the elevator system to cause the first elevator to remain at the current floor, the controller causes 1440 a motorized base of the mobile robot to move toward a target location within the first elevator. The target location may be marked with a fiducial tag.

SUMMARY

It should be noted that in various embodiments described herein, data captured by a robot can be stored and used for future machine-learning applications, to trained prediction models, to enable accountability (e.g., providing auditable logs), and the like. Some or all of this captured data can be provided to customers to enable customer-initiated analysis and auditing. This captured data can further be used to enhance various functions described herein, for instance by strengthening a semantic map (by including more detail within the map).

It should also be noted that although much of the functionality described herein is in reference to the performance of one or more security operations and functions, any type of operation or function can be performed and enabled, for instance facility operations, ES&H operations, and the like.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like, for instance, within a robot or robot system. Furthermore, it has also proven convenient at times, to refer to these arrangements of operations as modules or engines, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Further, the functionalities described herein can be performed by a hardware processor or controller located within the robot.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A mobile robot comprising:

a motorized base configured to move the mobile robot within an environment on a current floor of a plurality of floors;

a robot body on the motorized base;

a mechanical arm rotatably coupled to the robot body;

a memory storing a plurality of maps, each map corresponding to a floor of the plurality of floors; and a controller configured to:

communicate with a central system over a network to receive a map of the current floor;

navigate the motorized base on the current floor based on a route associated with the map of the current floor;

in response to determining the mobile robot has lost connectivity with the central server:

navigate the motorized base to an elevator based on the map of the current floor;

interact with an elevator system move the mechanical arm to actuate a call button associated with an elevator system a plurality of elevators to call an elevator to the current floor on which the mobile robot is located;

identify a door of a first the elevator of the plurality of elevators opening when the elevator arrives at the current floor;

responsive to identifying the door doors of the first elevator opening:

query a semantic map associated with the environment to determine the doors of the first elevator are closing after being fully opened, the semantic map including information describing a state of each of the plurality of elevators, wherein the semantic map is updated by a central system associated with the environment in real-time, and in response to determining that the mobile robot needs more time to enter the first elevator before the doors close, cause the mobile robot to wait until after the doors of the first elevator begin to close, cause a mechanical arm of the mobile robot to press a button of the elevator system to cause the doors of the first elevator to reopen after the doors of the first elevator begin to close but before doors fully close, wherein the first elevator is configured to leave the doors of the first elevator open longer when the mobile robot presses the button of the elevator system longer than when a human presses the button state of the first elevator before the mechanical arm presses the button indicates the doors are closing; and cause the motorized base to move the mobile robot toward a target location within the elevator;

responsive to determining that the elevator has arrived at the second floor and the door is open:

cause the motorized base to move the mobile robot outside the elevator; and cause the motorized base to move the mobile robot on the second floor to a location with connectivity.

2. The mobile robot of claim 1, wherein the controller is configured to identify determine the door is doors of the first elevator opening by detecting the door opening using a laser sensor based at least in part on a laser beam emitted toward the first elevator.

3. The mobile robot of claim 1, wherein:

the memory stores a semantic map associated with the environment; and the controller is configured to identify determine the door is doors of the first elevator opening by querying the semantic map associated with the environment to identify that the doors of the first elevator are opening.

4. The mobile robot of claim 1, wherein the controller is configured to cause the mechanical arm to press the call button further by:

capturing an image of a control panel of the elevator system, the control panel comprising one or more buttons;

performing image recognition on the captured image to determine pixel information associated with each button of the one or more buttons based on the captured image;

selecting the call button from the one or more buttons based on the target floor; and responsive to selecting the call button, causing the mechanical arm to move toward the button based on the pixel information associated with the selected call button.

5. The mobile robot of claim 1, wherein the controller is configured to cause the motorized base to move toward the target location within the elevator further by:

causing the motorized base to move to a location outside of the elevator, wherein an interior of the elevator is visible from the location outside the elevator;

identifying a fiducial tag associated with the target location within the first elevator; and responsive to identifying the fiducial tag associated with the target location, causing the motorized base to move toward the target location based on the fiducial tag.

6. The mobile robot of claim 1, wherein the mobile robot is remotely operated by a remote operator, and further comprising configuring responsive to determining the mobile robot has lost connectivity with the central server, the mobile robot is configured to operate in an autonomous mode after the mobile robot enters the first elevator.

7. A method for navigating a mobile robot between two floors of a plurality of floors in an environment, the method comprising:

communicating with a central system over a network to receive a map of a current floor;

storing, in a memory of the mobile robot, a plurality of maps including a semantic map associated with the environment and the map of the current floor, each map corresponding to a floor of the plurality of floors;

navigating the motorized base on the current floor based on a route associated with the map of the current floor;

in response to determining the mobile robot has lost connectivity with the central server;

interacting with an elevator system associated with a plurality of elevators, by a mobile robot, to call an elevator to a current floor on which the mobile robot is located;

navigating the mobile robot to an elevator based on a map of the current floor;

identifying, by the mobile robot, a door of a first the elevator of the plurality of elevators opening when the elevator arrives at the current floor;

responsive to identifying the door of the first elevator opening:

querying a semantic map associated with the environment to determine the doors of the first elevator are closing after being fully opened, the semantic map including information describing a state of each of the plurality of elevators, wherein the semantic map is updated by a central system associated with the environment in real-time, and moving the motorized base toward a target location within the elevator; and in response to determining that the mobile robot needs more time to enter the elevator before the door closes:

causing the mobile robot to wait until after the door doors of the first elevator begins to close; and causing a mechanical arm of the mobile robot to press a button of the elevator system to cause the door of the first elevator to reopen after the door of the first elevator begins to close but before the door fully closes, wherein, when the mobile robot presses the button, the elevator is configured to leave the door of the first elevator open longer when the mobile robot presses the button of the elevator system longer than when a human presses the button state of the first elevator before the mechanical arm presses the button indicates the doors are closing; and causing, by the mobile robot, the motorized base to move toward the target location within the first elevator;

responsive to determining that the elevator has arrived at the second floor and the door is open:

causing the motorized base to move the mobile robot outside the elevator; and causing the motorized base to move the mobile robot on the second floor to a location with connectivity.

8. The method of claim 7, wherein identifying determining the door of the first elevator is opening comprises:

emitting a laser beam toward the elevator;

detecting at least a portion of the laser beam reflected by the elevator; and determining whether the elevator doors are door is open based on the detection.

9. The method of claim 7, wherein identifying determining the door of the first elevator is opening comprises:

querying the semantic map associated with the environment;

based on the query, determining that the door of the first elevator is opening.

10. The method of claim 7, wherein causing the mechanical arm to press the button further comprises:

capturing an image of a control panel of the elevator system, the control panel comprising one or more buttons;

performing image recognition on the captured image to determine pixel information associated with each button of the one or more buttons based on the captured image;

selecting a button from the one or more buttons based on the target floor; and responsive to selecting the button, causing the mechanical arm to move toward the button based on the pixel information of the selected button.

11. The method of claim 7, wherein causing the motorized base to move toward the target location within the first elevator further comprises:

causing the motorized base to move to a location outside of the elevator, wherein an interior of the elevator is visible from the location;

identifying a fiducial tag associated with the target location within the elevator; and responsive to identifying the fiducial tag associated with the target location, causing the motorized base to move toward the target location.

12. The method of claim 7, wherein, while causing the motorized base to move the mobile robot toward the target location, disabling one or more control functions of remote operators.

13. A non-transitory computer readable storage medium storing computer program instructions, the instructions when executed by a processor causing the processor to:

communicate with a central system over a network to receive a map of the current floor;

navigate the motorized base on the current floor based on a route associated with the map of the current floor;

in response to determining the mobile robot has lost connectivity with the central server;

interact with an elevator system associated with a plurality of elevators to call an elevator to a current floor on which a mobile robot is located;

move the motorized base to an elevator based on the map;

identify a door of a first the elevator of the plurality of elevators opening when the elevator arrives at the current floor;

responsive to identifying the door of the first elevator opening:

query a semantic map associated with the environment to determine the doors of the first elevator are closing after being fully opened, the semantic map including information describing a state of each of the plurality of elevators, wherein the semantic map is updated by a central system associated with the environment in real-time, and moving the motorized base toward a target location within the elevator; and in response to determining that the mobile robot needs more time to enter the elevator before the closes:

cause the mobile robot to wait until after the door of the first elevator begins to close; and cause a mechanical arm of the mobile robot to press a button of the elevator system to cause the door of the first elevator to reopen after the door of the first elevator begins to close but before the door fully closes, wherein, when the mobile robot presses the button of the elevator system, the elevator is configured to leave the door of the first elevator open longer when the mobile robot presses the button of the elevator system longer than when a human presses the button state of the first elevator before the mechanical arm presses the button indicates the doors are closing; and cause a motorized base of the mobile robot to move toward a target location within the elevator;

responsive to determining that the elevator has arrived at the second floor and the door is open:

cause the motorized base to move the mobile robot outside the elevator; and cause the motorized base to move the mobile robot on the second floor to a location with connectivity.

14. The non-transitory computer-readable storage medium of claim 13, wherein the instructions to cause the mechanical arm to press the button further comprises instructions to:

capture an image of a control panel of the elevator system, the control panel comprising one or more buttons;

perform image recognition on the captured image to determine pixel information associated with each button of the one or more buttons based on the captured image;

select the button from the one or more buttons based on the target floor; and responsive to selecting the button, cause the mechanical arm to move toward the button based on the pixel information associated with the selected button.

* * * * *